US010719894B2

(12) United States Patent
Mori et al.

(10) Patent No.: US 10,719,894 B2
(45) Date of Patent: Jul. 21, 2020

(54) INFORMATION PROCESSING APPARATUS, INFORMATION PROCESSING METHOD, AND PROGRAM

(71) Applicant: NEC Corporation, Tokyo (JP)

(72) Inventors: Yusuke Mori, Tokyo (JP); Shintaro Nakano, Tokyo (JP); Satoru Ishii, Tokyo (JP); Hideo Hasegawa, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/765,192

(22) PCT Filed: Sep. 28, 2016

(86) PCT No.: PCT/JP2016/078574
§ 371 (c)(1),
(2) Date: Mar. 30, 2018

(87) PCT Pub. No.: WO2017/057432
PCT Pub. Date: Apr. 6, 2017

(65) Prior Publication Data
US 2018/0276768 A1 Sep. 27, 2018

(30) Foreign Application Priority Data

Oct. 1, 2015 (JP) .................................. 2015-196218

(51) Int. Cl.
G06Q 50/06 (2012.01)
H02J 13/00 (2006.01)
(Continued)

(52) U.S. Cl.
CPC ........... *G06Q 50/06* (2013.01); *G06F 1/3234* (2013.01); *H02J 3/14* (2013.01); *H02J 13/00001* (2020.01);
(Continued)

(58) Field of Classification Search
None
See application file for complete search history.

(56) References Cited

U.S. PATENT DOCUMENTS

2004/0133314 A1* 7/2004 Ehlers .................... G06Q 10/10
700/276
2007/0043478 A1* 2/2007 Ehlers .................... F24F 11/30
700/276
(Continued)

FOREIGN PATENT DOCUMENTS

JP 09-215193 A 8/1997
JP 2000-078748 A 3/2000
(Continued)

OTHER PUBLICATIONS

International Search Report of PCT/JP2016/078574 dated Dec. 27, 2016.

Primary Examiner — Jason Lin
(74) Attorney, Agent, or Firm — Sughrue Mion, PLLC

(57) ABSTRACT

An information processing apparatus includes a mode setting acceptance unit that accepts a setting of a time to control a plurality of devices, on the basis of a mode in which operation contents of the devices are set, and an execution unit that outputs the operation contents of the plurality of devices at the set time.

3 Claims, 21 Drawing Sheets

(51) Int. Cl.
*H02J 3/14* (2006.01)
*G06F 1/3234* (2019.01)
*H02J 3/00* (2006.01)

(52) U.S. Cl.
CPC ......... *H02J 13/00007* (2020.01); *H02J 3/003* (2020.01)

(56) References Cited

U.S. PATENT DOCUMENTS

| | | | | |
|---|---|---|---|---|
| 2010/0101254 A1* | 4/2010 | Besore | ................... | G06Q 50/06 62/264 |
| 2012/0296489 A1 | 11/2012 | Lee et al. | | |
| 2013/0173079 A1 | 7/2013 | Taira et al. | | |
| 2013/0197708 A1* | 8/2013 | Song | ........................ | H04Q 9/00 700/295 |
| 2014/0180488 A1 | 6/2014 | Hirayama | | |
| 2014/0188299 A1* | 7/2014 | Odakura | ................. | G05B 15/02 700/297 |
| 2014/0222234 A1* | 8/2014 | Hirayama | ............. | G06F 1/3234 700/295 |
| 2014/0277795 A1* | 9/2014 | Matsuoka | .......... | G06O 30/0202 700/291 |
| 2015/0073612 A1* | 3/2015 | Ireland | ................ | H04L 12/2816 700/295 |
| 2015/0088287 A1* | 3/2015 | Nagamatsu | ......... | H04L 12/2818 700/90 |
| 2015/0241895 A1* | 8/2015 | Lu | .......................... | G05B 15/02 700/295 |

FOREIGN PATENT DOCUMENTS

| | | | |
|---|---|---|---|
| JP | 2013-138553 A | | 7/2013 |
| JP | 2014-082813 A | | 5/2014 |
| JP | 2014082813 A | * | 5/2014 |
| JP | 2014-128107 A | | 7/2014 |
| JP | 2014-150627 A | | 8/2014 |
| JP | 2014-158408 A | | 8/2014 |

* cited by examiner

FIG. 9

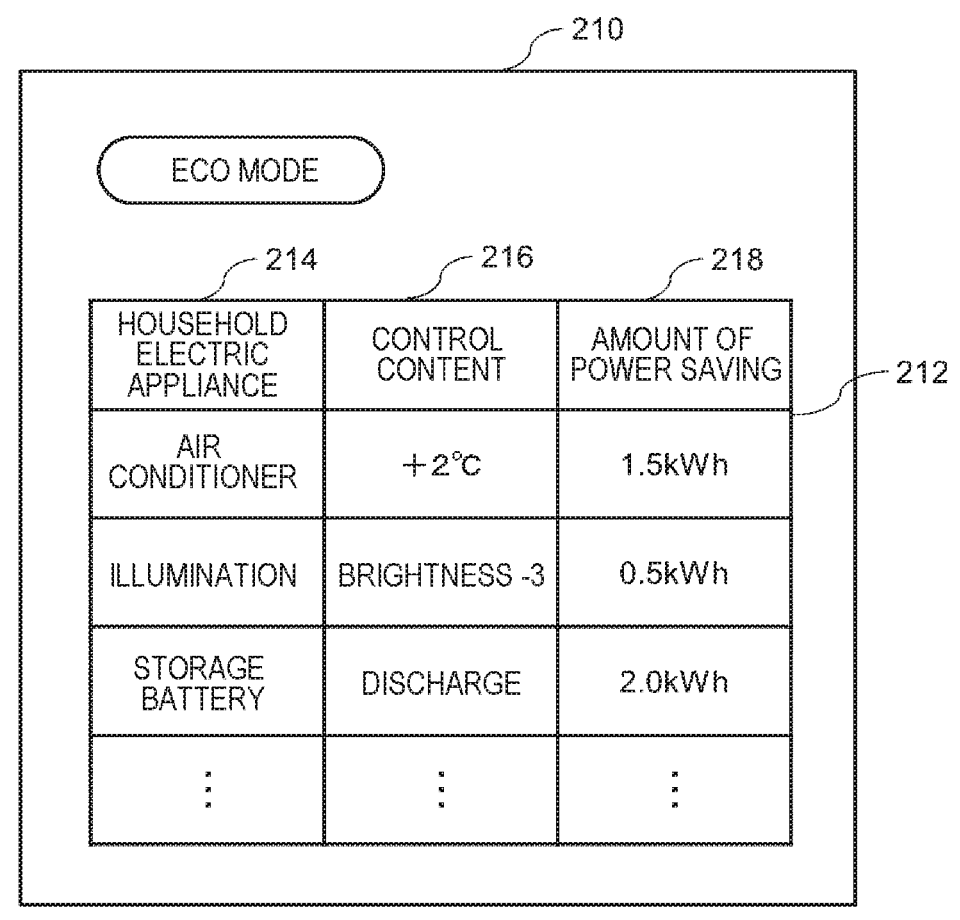

| HOUSEHOLD ELECTRIC APPLIANCE | CONTROL CONTENT | AMOUNT OF POWER SAVING |
|---|---|---|
| AIR CONDITIONER | +2°C | 1.5kWh |
| ILLUMINATION | BRIGHTNESS -3 | 0.5kWh |
| STORAGE BATTERY | DISCHARGE | 2.0kWh |
| ⋮ | ⋮ | ⋮ |

ECO MODE

FIG. 10

| HOUSEHOLD ELECTRIC APPLIANCE | CURRENT VALUE | CONTROL CONTENT | AMOUNT OF POWER SAVING |
|---|---|---|---|
| AIR CONDITIONER | 25°C | 27°C | 1.5kWh |
| ILLUMINATION | BRIGHTNESS 5 | BRIGHTNESS 2 | 0.5kWh |
| STORAGE BATTERY | CHARGE | DISCHARGE | 2.0kWh |
| ⋮ | ⋮ | ⋮ | ⋮ |

FIG. 15A

320 DEVICE SETTING STORAGE UNIT (ECO 1 MODE)

| DEVICE (112) | CONTROL CONTENT (114) | AMOUNT OF POWER SAVING (116) |
|---|---|---|
| AIR CONDITIONER | +3°C | 2.0kWh |
| ILLUMINATION | BRIGHTNESS -3 | 0.5kWh |
| STORAGE BATTERY | DISCHARGE | 2.0kWh |
| ⋮ | ⋮ | ⋮ |

FIG. 15B

320 DEVICE SETTING STORAGE UNIT (ECO 2 MODE)

| DEVICE (112) | CONTROL CONTENT (114) | AMOUNT OF POWER SAVING (116) |
|---|---|---|
| AIR CONDITIONER | +1°C | 1.0kWh |
| ILLUMINATION | BRIGHTNESS -1 | 0.2kWh |
| STORAGE BATTERY | DISCHARGE | 2.0kWh |
| ⋮ | ⋮ | ⋮ |

FIG. 16A

410 DEVICE SETTING STORAGE UNIT (NORMAL)

| DEVICE | CURRENT VALUE | CONTROL CONTENT | AMOUNT OF POWER SAVING |
|---|---|---|---|
| AIR CONDITIONER | 30°C | 29°C | 2.0kWh |
| ILLUMINATION | BRIGHTNESS 5 | BRIGHTNESS 2 | 0.5kWh |
| STORAGE BATTERY | CHARGE | DISCHARGE | 2.0kWh |
| ⋮ | ⋮ | ⋮ | ⋮ |

FIG. 16B

410 DEVICE SETTING STORAGE UNIT (DURING HIGH TEMPERATURES (35°C OR HIGHER))

| DEVICE | CURRENT VALUE | CONTROL CONTENT | AMOUNT OF POWER SAVING |
|---|---|---|---|
| AIR CONDITIONER | 30°C | 27°C | −0.5kWh |
| ILLUMINATION | BRIGHTNESS 5 | BRIGHTNESS 2 | 0.2kWh |
| STORAGE BATTERY | CHARGE | DISCHARGE | 2.0kWh |
| ⋮ | ⋮ | ⋮ | ⋮ |

FIG. 17

| TIME | MODE |
|---|---|
| 8-11 O'CLOCK | ECO 1 |
| 11-15 O'CLOCK | NORMAL |
| 15-22 O'CLOCK | ECO 1 |

306 TIME SETTING STORAGE UNIT (DURING HIGH TEMPERATURES)

FIG. 19

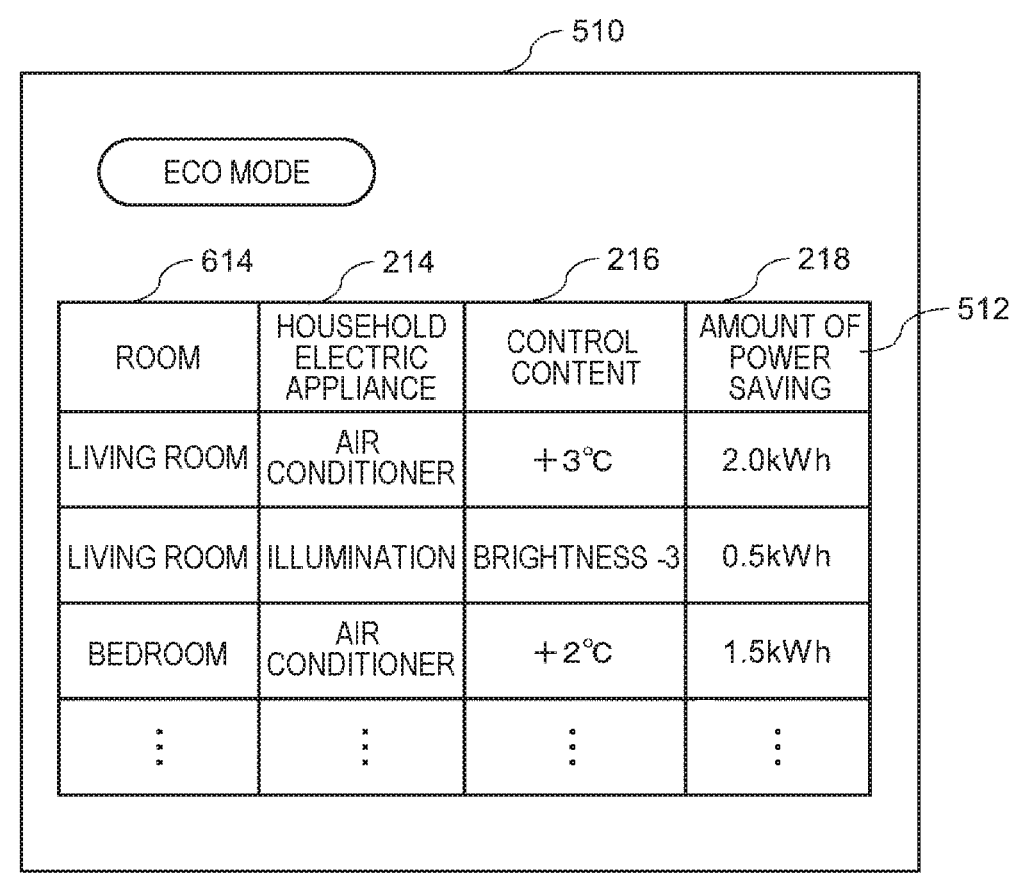

| ROOM | HOUSEHOLD ELECTRIC APPLIANCE | CONTROL CONTENT | AMOUNT OF POWER SAVING |
|---|---|---|---|
| LIVING ROOM | AIR CONDITIONER | +3°C | 2.0kWh |
| LIVING ROOM | ILLUMINATION | BRIGHTNESS -3 | 0.5kWh |
| BEDROOM | AIR CONDITIONER | +2°C | 1.5kWh |
| ⋮ | ⋮ | ⋮ | ⋮ |

ECO MODE

INFORMATION PROCESSING APPARATUS, INFORMATION PROCESSING METHOD, AND PROGRAM

CROSS REFERENCE TO RELATED APPLICATIONS

This application is a National Stage of International Application No. PCT/JP2016/078574 filed Sep. 28, 2016, claiming priority based on Japanese Patent Application No. 2015-196218 filed Oct. 1, 2015.

TECHNICAL FIELD

The present invention relates to an information processing apparatus, an information processing method, and a program, and particularly relates to an information processing apparatus, an information processing method, and a program to manage an amount of power consumed by a consumer.

BACKGROUND ART

Patent Document 1 discloses that a consumer selects operation patterns in which the degrees of saving are different from each other depending on the operation contents of a device, and that a device is controlled based on the operation contents of a selected operation pattern during a time slot of a request for a reduction in power consumption from an electric power company. In addition, an operation to control a consumer's load may be learned, and thus the contents of a pattern operation may be automatically corrected. For example, the degree of saving may be corrected from 50% to 60%.

In addition, Patent Documents 2 and 3 disclose controlling a consumer's device in response to a demand response.

For example, Patent Document 2 discloses a technique for calculating the order of consumers to reduce the amount of power consumption in response to a demand response signal for each consumer within a community, and eliminating biasing among the consumers with regard to reduction in power consumption.

Patent Document 3 discloses a technique for generating power demand data according to an excess power consumption amount with respect to a target amount of a predicted power consumption amount and performing screen display of a priority order for stopping power generation, a cutoff level of a device to be stopped, and a scheduled cutoff time in accordance with the demand data in an easily graspable manner.

RELATED DOCUMENTS

Patent Documents

[Patent Document 1] Japanese Unexamined Patent Application Publication No. 2000-78748
[Patent Document 2] Japanese Unexamined Patent Application Publication No. 2014-150627
[Patent Document 3] Japanese Unexamined Patent Application Publication No. H09-215193

SUMMARY OF THE INVENTION

Technical Problem

In the techniques disclosed in the above-described Patent Documents, since configurations are adopted in which a load is controlled during a time slot requested by the electric power company to reduce power consumption using an operation pattern selected by the consumer, the setting of a time slot-specific schedule of an operation pattern has not been considered. Therefore, in a case where it is not known beforehand which time slot the electric power company will request for a reduction in power consumption, there may be the possibility that a previously set operation pattern will be used even if the consumer is not home, and thus there is a problem in that the operation is not necessarily appropriately set.

The present invention is contrived in view of such circumstances, and an object thereof is to provide an information processing apparatus, an information processing method, and a program that allows to appropriately and easily perform a time setting to switch to a mode allowing to suppress an amount of power consumed by a consumer.

Solution to Problem

In each aspect of the present invention, each of the following configurations is adopted in order to solve the above-mentioned problem.

A first aspect relates to an information processing apparatus.

According to the first aspect, there is provided an information processing apparatus including: a mode setting acceptance unit that accepts a setting of a time to control a plurality of devices, on the basis of a mode in which operation contents of the devices are determined; and an execution unit that outputs the operation contents of the plurality of devices at the set time.

The second aspect relates to an information processing method which is executed by at least one computer.

According to the second aspect, there is provided an information processing method executed by an information processing apparatus, the method including: accepting a setting of a time to control a plurality of devices, on the basis of a mode in which operation contents of the devices are determined; and outputting the operation contents of the plurality of devices at the set time.

It should be noted that, in another aspect of the present invention, there may be provided a program causing at least one computer to execute the method according to the second aspect, and a computer readable storage medium having such a program recorded thereon. This storage medium includes a non-transitory tangible medium.

When such a computer program is executed by a computer, the computer program includes computer program codes causing the computer to carry out an information processing method on an information processing apparatus.

Any combination of the foregoing components, and those obtained by converting the representation of the present invention between a method, a device, a system, a storage medium, a computer program, and the like are also effective as aspects of the present invention.

In addition, various types of components of the present invention are not necessarily required to be present individually and independently, but a plurality of components may be formed as one member, one component may be formed by a plurality of members, a certain component may be a portion of another component, a portion of a certain component and a portion of another component may overlap each other, or the like.

In addition, a plurality of procedures are described in order in the method and the computer program of the present invention, but the order of the description is not intended to limit the order of the execution of the plurality of procedures. Therefore, when the method and the computer program of the present invention are executed, the order of the plurality of procedures can be changed within the range of not causing any problem in terms of the contents.

Further, the plurality of procedures of the method and the computer program of the present invention are not limited to be individually executed at timings different from each other. Therefore, another procedure may occur during the execution of a certain procedure, the execution timing of a certain procedure and a portion or all of the execution timings of another procedure may overlap each other, or the like.

Advantageous Effects of Invention

According to each of the aspects, it is possible to provide an information processing apparatus, an information processing method, and a program that allows to appropriately and easily perform a time setting to select a mode allowing to suppress an amount of power consumed by a consumer.

BRIEF DESCRIPTION OF THE DRAWINGS

The above and other objects, features and advantages will be made clearer from certain preferred embodiment described below, and the following accompanying drawings.

FIG. 9 is a diagram illustrating an example of a display screen of operation contents of each device specified in an energy saving mode in the information processing apparatus according to the example embodiment of the present invention.

FIG. 10 is a diagram illustrating another example of a display screen of operation contents of each device specified in an energy saving mode in the information processing apparatus according to the example embodiment of the present invention.

FIGS. 15A and 15B are diagrams each illustrating an example of a data structure of the device setting storage unit of the information processing apparatus of the present example embodiment.

FIGS. 16A and 16B are diagrams each illustrating an air temperature condition-specific setting example of the device setting storage unit of the information processing apparatus of the present example embodiment.

FIG. 17 is a diagram illustrating an example of a data structure of the time setting storage unit of the information processing apparatus of the present example embodiment.

FIG. 19 is a diagram illustrating an example of a display screen of operation contents of each device specified in an energy saving mode in the information processing apparatus according to the example embodiment of the present invention.

DESCRIPTION OF EMBODIMENTS

Figure 1:
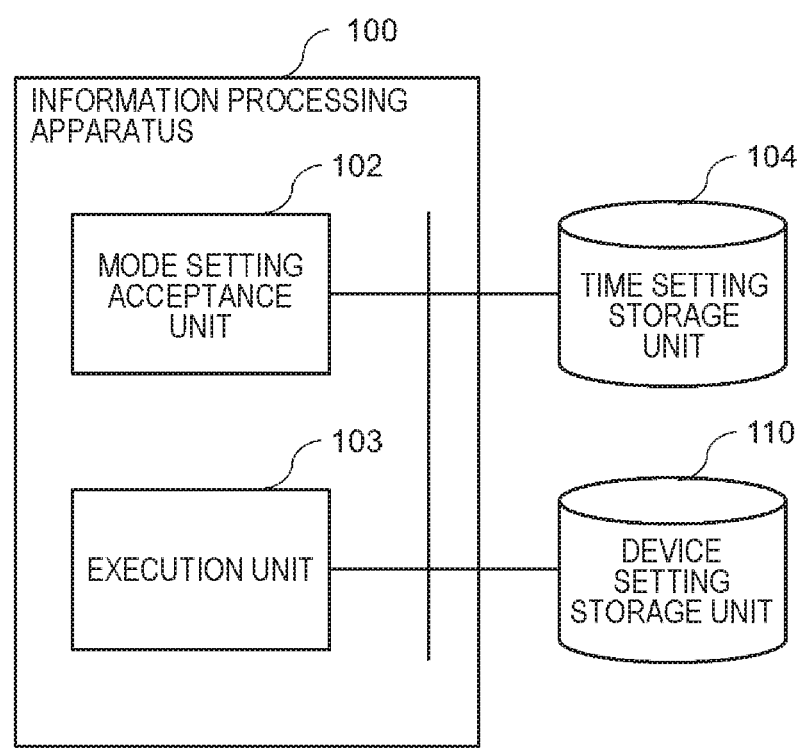
FIG. 1 is a functional block diagram logically illustrating a configuration of an information processing apparatus according to an example embodiment of the present invention.

Hereinafter, example embodiments of the present invention will be described with reference to the accompanying drawings. In all the drawings, like elements are referenced by like reference numerals and the descriptions thereof will not be repeated.

First Example Embodiment

An information processing apparatus, an information processing method and a program according to a first example embodiment of the present invention will be described below.

FIG. 1 is a functional block diagram logically illustrating a configuration of an information processing apparatus 100 according to the example embodiment of the present invention.

The information processing apparatus 100 of the present example embodiment includes a mode setting acceptance unit 102 that accepts a setting of a time to execute control of the devices on the basis of a mode in which the operation contents of a plurality of devices are determined, and an execution unit 103 that outputs operation contents of the plurality of devices at the set time.

Various devices that consume power may be present in a consumer's home. By appropriately setting the operations of these devices, it is possible to suppress the amount of power consumption. However, it takes time and effort to change the setting of the operations of a plurality of devices one by one. In addition, in the first place, it is hard for a consumer to easily understand the appropriate settings that make it possible to suppress the amount of power consumption.

In addition, it is expected that the number of power producer and suppliers (PPS) that supply electricity through power transmission networks of general electric power suppliers (electric power companies) will increase in the future with the start of the deregulation of electric power. Since a PPS feeds power to a consumer through an electric company in the consumer's area, the PPS undertakes an obligation of the "30-minute balancing rule" for matching the PPS's supply with the consumer's demand in units of 30 minutes with respect to the electric power company.

Consequently, the PPS plans a demand response for performing demand control so that the amount of demand from the consumer and the amount of supply from the PPS are coincident with each other. By transmitting a demand response including a target value of the power consumption amount to be reduced by each consumer during thirty minutes, or transmitting control contents of an operation during thirty minutes after the transmission of demand control information or the reception thereof, the amount of power consumed by the consumer can be controlled, and thus the 30-minute balancing rule may be met.

However, in a case where a consumer receives a demand response, as described above, it has been difficult for the consumer to understand how to efficiently reduce the amount of power consumption, and thus it has been difficult to urge the consumer to participate in the demand response.

Consequently, in the present invention, settings of operation contents of a plurality of devices which make it possible to suppress the total amount of power consumed by a consumer are prepared by packaging the settings as at least one mode in advance, and the consumer can suppress the amount of power consumption just by setting a time to turn on the mode.

Figure 2:
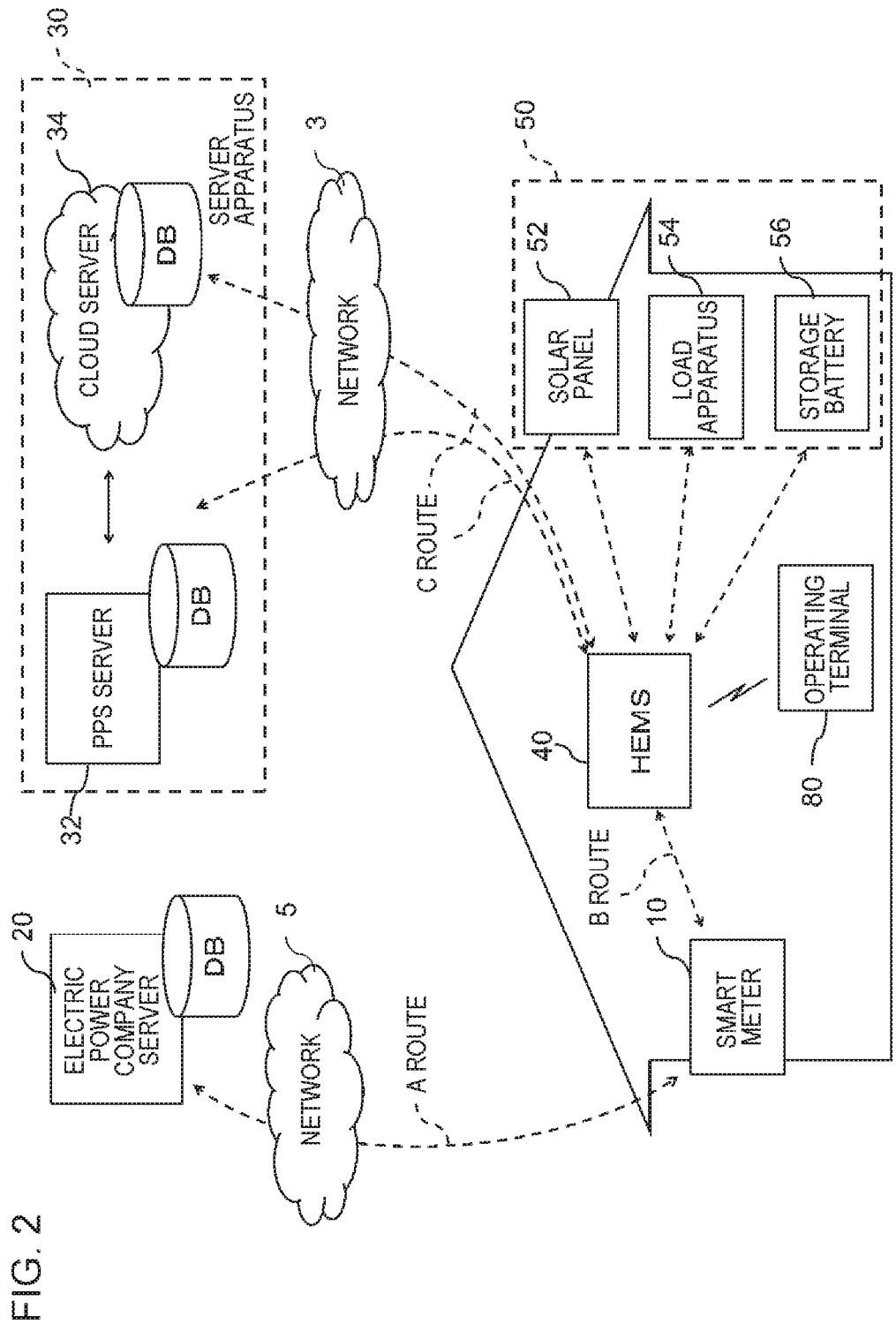
FIG. 2 is a diagram conceptually illustrating an entire configuration example of an information processing system including the information processing apparatus according to the example embodiment of the present invention.

FIG. 2 is a diagram conceptually illustrating an entire configuration example of an information processing system including the information processing apparatus 100 according to the example embodiment of the present invention.

The information processing apparatus 100 of the present invention of FIG. 1 is implemented by, for example, at least any one of a home energy management system (HEMS) 40 communicating with devices within a home (including, for example, ECHONET Lite (Registered Trademark) authentication device) and a server apparatus 30 (PPS server 32 or cloud server 34) that provides services of the information processing system of the present invention to a user, or a combination thereof.

Figure 3:
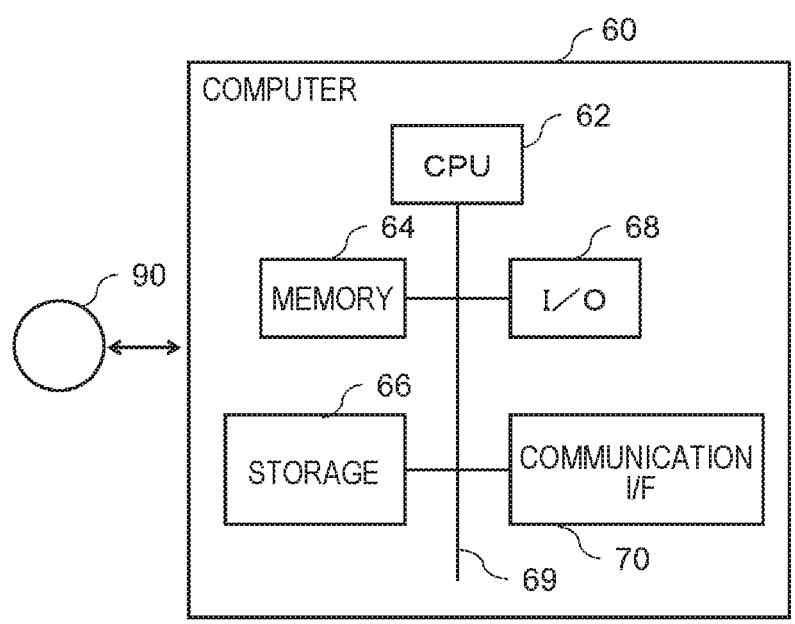
FIG. 3 is a block diagram illustrating a configuration example of a computer that implements the information processing apparatus of FIG. 1.

FIG. 3 is a block diagram illustrating a configuration example of a computer 60 that implements the information processing apparatus 100 of FIG. 1. The information processing apparatus 100 is implemented by at least one computer 60, but may also be implemented by a configuration in which a plurality of computers 60 are combined. In the present example embodiment, an example is described in which the information processing apparatus 100 is implemented by the HEMS 40. In a case where the information processing apparatus 100 is implemented by the server apparatus 30, the server apparatus 30 is also implemented by the same computer as the computer 60 of FIG. 3.

In a case where the information processing apparatus is implemented by a combination of the HEMS 40 and the server apparatus 30, the transmission and reception of information may be performed through a network 3 between the HEMS 40 and the server apparatus 30.

In the present example embodiment, a configuration in which the information processing apparatus 100 is implemented by the HEMS 40 will be described as an example, but the information processing apparatus 100 may be configured to be implemented by a communication apparatus having a gateway function of wirelessly communicating with, for example, a smart meter 10 or each device 50 within a consumer's home instead of the HEMS 40, and wirelessly communicating with the PPS server 32 or the cloud server 34 through the C route.

The computer 60 includes a central processing unit (CPU) 62, a memory 64, a program 90 loaded into the memory 64 for implementing at least a portion of components of FIG. 1, a storage 66 such as a hard disk that stores the program 90, an input/output (I/O) 68, an network connection interface (communication I/F) 70. The respective elements of the computer 60 are connected to each other through a bus 69, and the entire apparatus implemented by the computer 60 together with each element is controlled by the CPU 62.

Each component of the information processing apparatus 100 of the present example embodiment of FIG. 1 and an information processing apparatus of each of the other example embodiments described below is implemented by any combination of hardware and software of the computer 60 of FIG. 3. It will be understood by those skilled in the art that implementing methods and apparatuses thereof may be modified in various ways. A functional block diagram illustrating each apparatus of each example embodiment which will be described below shows a block of a logical functional unit rather than a configuration of a hardware unit. In addition, in each of the following drawings, the configurations of portions irrelevant to the essence of the present invention are omitted and not shown.

In the present example embodiment, a user interface function of the information processing apparatus 100 may be implemented by at least one of a display unit (not shown) and an operating unit (not shown) of the HEMS 40 and a display unit (not shown) and an operating unit (not shown) of an operating terminal 80. Alternatively, the user interface function may be implemented by a display unit and an operating unit of a user terminal (not shown) such as a user's cellular phone, smartphone, or personal computer. The display unit and the operating unit may be a touch panel or the like having both the units formed integrally with each other.

The operating terminal 80 or the user terminal of FIG. 2 communicates with the HEMS or the server apparatus 30, displays an operation screen on, for example, a touch panel, and implements the user interface function of the information processing apparatus 100. The operating terminal 80 or the user terminal has also the same hardware configuration that of the computer 60 of FIG. 3. The user interface function of the information processing apparatus 100 may be implemented by executing an application program on the operating terminal 80 or the user terminal, and a configuration may be used in which the operation screen of the information processing apparatus 100 is displayed on the display unit by accessing a predetermined web site that provides services of the information processing apparatus 100 of the present example embodiment from the operating terminal 80 or the user terminal.

Each function of each unit of FIG. 1 of the information processing apparatus 100 may be implemented by the CPU 62 of the computer 60 of FIG. 3 reading out the program 90 stored in the storage 66 to the memory 64 and executing the read-out program.

As described above, in the information processing apparatus 100 of the present invention, a plurality of configuration examples are considered, and the program 90 for implementing the information processing apparatus 100 is executed by at least one computer 60. Computers that execute each procedure of a program for each configuration example are different from each other, and the execution of each procedure of a program by any of the computers is considered to have various forms.

The computer program 90 of the present example embodiment is described so as to cause the computer 60 for implementing the information processing apparatus (HEMS 40 or server apparatus 30) to execute a procedure of accepting the setting of a time to control a plurality of devices and a procedure of outputting operation contents of the devices at the set time, on the basis of at least one mode in which the operation contents of a plurality of devices are determined.

The computer program 90 of the present example embodiment may be stored in a storage medium readable by the computer 60. The storage medium is considered to have various forms without being particularly limited. In addition, the program 90 may be loaded from the storage medium into the memory 64 of the computer 60, and may be downloaded in the computer 60 through a network and be loaded into the memory 64.

The storage medium having the computer program 90 stored therein includes a medium capable of being used by the non-transitory tangible computer 60, and has program codes readable by the computer 60 embedded in the medium. When the computer program 90 is executed on the computer 60, the computer 60 is caused to execute an information processing method, described later, for implementing the information processing apparatus 100.

Referring back to FIG. 2, in the present invention, the devices 50 are various devices that consume or supply power in a consumer's home. For example, the device 50 may include a power related apparatus, for example, a solar photovoltaic apparatus (solar panel 52), a storage battery 56, a fuel cell (not shown), an electric automobile (not shown), a plug-in hybrid automobile (not shown), a water heater (not shown), an ECHONET Lite (Registered Trademark) authentication device such as an air conditioner or an illumination device, and a load device 54 such as other household electric appliances.

Examples of the devices 50 include those that consume power, those capable of supplying power, and those capable of consuming and supplying power. In the present invention, operation contents of a device are changed in order to reduce the total amount of power consumed by a consumer, but operation contents that make it possible to reduce the total amount of power consumed by a consumer are different from each other depending on the type of device.

Examples of the devices that consume power include a load device 54 such as an electric automobile, a plug-in hybrid automobile, a water heater, an ECHONET Lite authentication device such as an air conditioner or an illumination device, and other household electric appliances.

In these devices 50, in order to reduce the total amount of power consumed by a consumer, operation settings are performed to stop the operation of the device 50, to change the settings of the temperature, illuminance, air volume, speed, sound volume, or other output settings, or to use an energy saving operation function provided in the device.

In addition, examples of devices that supply power include the solar panel 52 and the like. Power generated by the solar panel 52 may be used in a consumer's home, sold to an electric power company or a PPS, or stored in the storage battery 56 or the like. Therefore, in the solar panel 52, in order to reduce the total amount of power consumed by a consumer, operation settings are performed for using power generated by the solar panel 52 instead of supply of power from an electric power company or a PPS.

Further, examples of devices capable of consuming and supplying power include the storage battery 56, a fuel cell, an electric automobile, a plug-in hybrid automobile, and the like. Since these devices are capable of charging or discharging electricity, a charge operation is stopped and a discharge operation is performed in order to reduce the total amount of power consumed by a consumer.

In this manner, in the present example embodiment, the operation of each device 50 is controlled, and thus it is possible to reduce the total amount of power consumed by a consumer.

The operation contents of the device 50 are exemplified below, but are not limited thereto, and a plurality of contents may be combined:

(a1) switching among operation, stop, standby or the like of a device 50;

(a2) switching to an operating mode of the device 50 (particularly to a mode such as an energy saving mode or a full power mode, which makes it possible to suppress the amount of power consumption); and (a3) outputting settings of the temperature, illuminance, air volume, speed, sound volume, and the like, and switching discharge and charge of electricity of the device 50.

In addition, the setting of a mode may be performed in a predetermined time unit, and is not particularly limited. For example, the setting may be performed based on time, a time slot, a predetermined period such as daytime and nighttime, a date (the end of the month may be specified), day of the week (or weekday or holiday), week, or month, and the like, or a combination thereof. In addition, a periodic setting (repetitive setting) may be performed.

In the present example embodiment, a case where a mode setting can be performed using a day (24 hours) as a time unit will be described by way of example.

The smart meter 10 is an electric energy meter having a communication function. For example, the smart meter 10 is supplied from an electric power company to a consumer. The electric energy meter measures the consumption of power supplied from an electric power company or a PPS. Information such as the measured amount of power consumption is transmitted periodically (for example, at thirty-minute intervals) from the smart meter 10 to an electric power company server 20 of an electric power company through a so-called "A route".

The communication method in the A route between the smart meter 10 and the electric power company server 20 is not particularly limited, and a specific low-power wireless system using, for example, the 920 MHz band, or a cellular phone communication system such as 3rd Generation (3G) or long term evolution (LTE) may be used.

Further, the smart meter 10 may transmit information such as the amount of power consumption to the HEMS 40 having a gateway function through a so-called "B route" separate from the A route. The communication method in the B route between the smart meter 10 and the HEMS 40 is not particularly limited, and a specific low-power wireless system using, for example, the 920 MHz band, for example, a communication system based on a communication standard such as WiSUN, or a communication system of a wireless communication standard operating on IEEE802.15.4 such as Zigbee (Registered Trademark) may be used.

The communication system between the HEMS 40 and the server apparatus 30 (PPS server 32 or cloud server 34) is not particularly limited, and a wireless communication system such as, for example, worldwide interoperability for microwave access (WiMAX), 3G, or LTE may be used.

The HEMS 40 performs wireless or wired communication with the operating terminal 80, and displays various types of screens on the display unit of the operating terminal 80. The operating terminal 80 may accept a user's operation, and transmit the operation contents to the HEMS 40 or the server apparatus 30.

The mode setting acceptance unit 102 of FIG. 1 may accept the setting contents in accordance with the operation contents of the HEMS 40 or the operating terminal 80.

In the present invention, the HEMS 40 may acquire information relating to the amount of power consumed by a consumer from the smart meter 10, and may further acquire information from a power measurement apparatus (not shown).

The power measurement apparatus is connected to power related apparatuses such as the solar panel 52, the load device 54, and the storage battery 56. The power measurement apparatus may be included in a residential power distribution panel (not shown). In addition, for example, a current transformer (CT) is connected to the power measurement apparatus (power distribution panel). The current waveform (voltage waveform) of the total current (or voltage) consumption of the entirety of a plurality of devices connected to the power distribution panel is acquired by the CT. The total power consumption of the entirety of the plurality of devices connected to the power distribution panel may be acquired by one CT or a plurality of CTs.

The power measurement apparatus may have a function of transmitting information relating to the measured amount of power used by each device 50 to the HEMS 40 through wireless communication. The HEMS 40 and the power measurement apparatus may be one apparatus provided with each function.

In addition, the information relating to the amount of power used by each device 50 may be acquired by various methods, and may be acquired from an ECHONET Lite authentication device as to be described later, acquired using a device separation technique from the waveform of the total current (or voltage) consumption acquired by the CT, or acquired from a smart tap.

In addition, a communication system between the HEMS 40 and each device 50 is not particularly limited, and a specific low-power wireless system using, for example, the 920 MHz band, for example, a communication system based on a communication standard such as WiSUN, or a communication system of a wireless communication standard operating on IEEE802.15.4 such as Zigbee (Registered Trademark) may be used. In the present example embodiment, the device 50 may also include an ECHONET Lite authentication device communicating with the HEMS 40 in accordance with an ECHONET Lite communication standard.

In the present specification, the term "acquire" includes at least any one of an own apparatus fetching data or information stored in another apparatus or a storage medium (active acquisition) such as, for example, receiving the data or information by sending a request or a query to another apparatus or reading out the data or information by accessing another apparatus or a storage medium, and inputting data or information, output from another apparatus, to the own apparatus (passive acquisition) such as, for example, receiving data or information to be delivered (transmitted, push-notified or the like). In addition, the acquisition also includes performing selection and acquisition from the received data or information, or selecting and receiving the delivered data or information.

Referring back to FIG. 1, in the present example embodiment, the mode setting acceptance unit 102 is assumed to accept the setting of an energy saving mode (shown by "ECO" in the drawing) for suppressing the amount of power consumed by a consumer. In the energy saving mode, the operation contents of a plurality of devices 50 present in a consumer's home are assumed to be determined in advance to allow the total amount of power consumed by a consumer to be suppressed.

Figure 4:
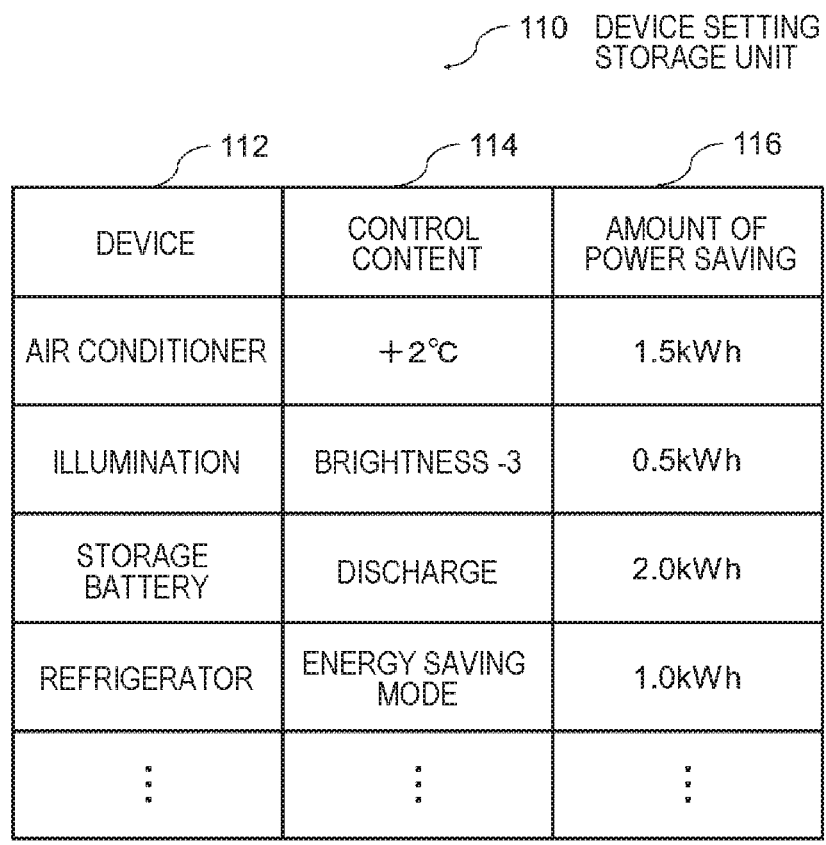
FIG. 4 is a diagram illustrating an example of a data structure of a device setting storage unit of the information processing apparatus according to the example embodiment of the present invention.

FIG. 4 is a diagram illustrating an example of a data structure of a device setting storage unit 110 of the information processing apparatus 100 according to the example embodiment of the present invention.

A plurality of pieces of consumer device information 112, specific control contents 114 for each device in the energy saving mode, and a power saving amount 116 (difference between the amounts of power consumption before and after control) in a case where the devices are operated based on the control contents, are stored in the device setting storage unit 110 in association with each other.

The consumer device information 112 includes at least any of information registered with the cloud server 34 or the HEMS 40 by a consumer in advance, and device information acquired by the HEMS 40 performing communication with an ECHONET Lite authentication device. The consumer device information 112 is indicated by identification information such as the name of the device 50, and includes at least any one of, for example, a product name of the device, a general name as a household electric appliance (such as refrigerator, air conditioner), a product model number or serial number, a given name arbitrarily registered by the user (such as "living room air conditioner" and "bedroom air conditioner"), and the like.

The control contents 114 are set with operation contents of a plurality of devices for each mode, and include, for example, the operation contents (control contents) of each device 50 in the energy saving mode. For example, in the example of FIG. 4, control contents for lowering the level of brightness of a light emitting diode (LED) illumination device by three levels, setting the temperature of an air conditioner higher by two degrees, switching charge of a storage battery to discharge, and switching the mode of a refrigerator to the energy saving mode, are stored in association with devices. In this example, the control contents of the air conditioner and the LED illumination device are indicated by relative values from current set values, but may be the value itself to be set (absolute value) (for example, 28 degrees for the set temperature of the air conditioner, and the like) as to be described later.

The control contents 114 of each device 50 shown in FIG. 4 may be, for example, information of an adjusted value which is set on the basis of the recommended setting or the like of the device manufacturer, or information (a mode to be set) indicating switching to an operation mode that makes it possible to achieve energy saving included in each device 50 as a function.

The server apparatus 30 may determine control contents for each device in advance, automatically set the corresponding control contents on the basis of information of a consumer's device, and store the control contents in the device setting storage unit 110.

Examples of operation modes included in each device 50 as power saving functions include a mode to automatically switch fan and cooling operations of an air conditioner, a mode to automatically switch heating and circulator operations, a mode to automatically control the automatic ice making operation or the temperature of a refrigerator, a mode to automatically control operation of the refrigerator in accordance with the amount of stored objects in the refrigerator, a mode to automatically adjust the brightness, image quality and the like of a liquid crystal television, a mode to perform operation of a hot-water heating system by setting the temperature to be lower than normal, and the like.

The present invention has a feature of determining the set contents of each device for each mode in advance, allowing a user to suppress the amount of power consumption just by setting the time of the mode, but it is not excluded to further have a configuration in which the set contents of each device may be manually adjusted or changed by a consumer.

The power saving amount 116 indicates the amount of power that would be saved for each device 50 in a case where each device 50 is controlled by the control contents 114. The power saving amount is obtained from a difference between the amounts of power consumption before and after control. The value of the power saving amount calculated in this manner is stored for each device 50. In addition, the power saving amount 116 is not required to be stored in the device setting storage unit 110, and a configuration may be adopted in which the power saving amount is calculated and displayed when detailed information of a device to be described later is displayed. In addition, a configuration may be adopted in which, as other information, the amount of power consumption during control or an electricity rate according to the control contents 114 is calculated and stored or displayed for each device. The amount of power consumption may be acquired by a power consumption acquisition unit to be described later, and the electricity rate may be calculated from the amount of power consumption.

In the configuration of the present example embodiment in which the entire configuration of the information processing apparatus 100 of FIG. 1 is implemented by the HEMS 40, device information of a consumer's home is stored in the device setting storage unit 110. The device setting storage unit 110 is implemented by the memory 64 or the storage 66 of the computer 60 constituting the HEMS 40.

In a configuration in which the information processing apparatus 100 includes at least the server apparatus 30 (cloud server 34), the device setting storage unit 110 may be implemented by a database of the cloud server 34, and device information may be stored for each consumer with respect to a plurality of consumers.

As to be described later, the operation contents of each device 50 stored in the device setting storage unit 110 may also be appropriately changed.

It should be noted that the information processing apparatus 100 of the present example embodiment includes at least one of a configuration in which, in accordance with the operation contents (control contents 114 in the device setting storage unit 110) of each device 50 specified in the set mode (herein, energy saving mode), for example, an ECHONET Lite authentication device or the like automatically controls operation of each device 50 through the HEMS 40, and a configuration in which, in a case where the device 50 is not adaptable to automatic control, the consumer is notified of the operation contents for setting the device 50 or an operation method for setting the device 50, so that the consumer may manually operate the device.

In addition, the information processing apparatus 100 includes at least one of a configuration in which, after the execution time of the mode (energy saving mode) is terminated, automatically controlling each device 50 to a setting before the control to the mode, and a configuration in which a consumer manually operates each device 50 by being notified of the setting operation contents or a method for returning each device 50 to a setting before the control to the mode or the consumer is notified that the execution time of control according to operation contents of a plurality of devices is terminated.

In the configuration for controlling each device to return to the setting before the control, in a case of performing control opposite to the control contents 114, for example, when performing control for raising the set temperature by 2° C., control may be performed for lowering the set temperature by 2° C. Alternatively, a setting before the control may be further stored in the device setting storage unit 110, and control for returning to the setting before the control may be performed. Alternatively, the default setting value of each device 50 may be stored in the device setting storage unit 110, and control for setting to the default setting value may be performed.

In addition, the information processing apparatus 100 may include a configuration (power consumption acquisition unit (not shown)) allowing to acquire operating state information of a device or the amount of power consumed thereby. In this case, at a time to turn on the energy saving mode, the information processing apparatus 100 preferably includes a configuration of acquiring operating state information of a device or the amount of power consumed thereby, determining whether the actual amount of power consumed is lower than the amount of power that would be consumed which is calculated in accordance with the operation contents of the set mode, and refrain from controlling the device in a case where the actual amount of power consumption is lower than the calculated amount. This is because a setting change is not required to be performed in a case where a device is already in a set state in which the amount of power consumption is lower than a set state specified in the energy saving mode (for example, in a case where the device is stopped or the like).

In other words, a configuration is preferable in which control of the device is performed in a case where the actual amount of power consumed by a device which is acquired by the power consumption acquisition unit is larger than the amount of power consumption in a case where the device is controlled in accordance with the operation contents of a set mode. The power consumption acquisition unit acquires the operating state information or the amount of power consumption of a device thereby from the ECHONET Lite authentication device, analyzes and acquires the information or amount using a device separation technique from the amount of power acquired by the CT, or acquires the information or amount using a smart tap or the like.

Figure 5:
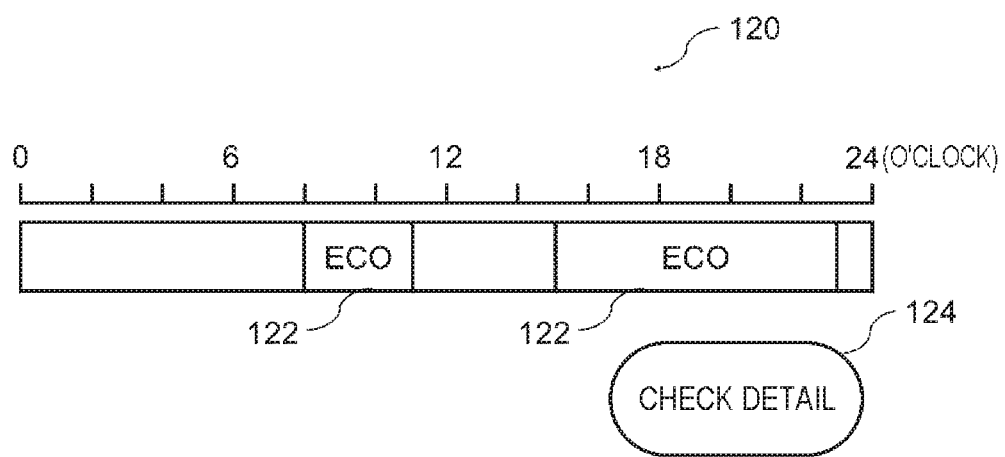
FIG. 5 is a diagram illustrating an example of a screen displayed on an operating terminal by the information processing apparatus according to the example embodiment of the present invention.

FIG. 5 is a diagram illustrating an example of a screen 120 displayed on the operating terminal 80 or the like by the information processing apparatus 100 according to the example embodiment of the present invention.

In a case where, for example, reservations for the energy saving mode during 8-11 o'clock and 15-23 o'clock are set on the mode time setting screen (not shown), as shown in the screen 120, regions 122 (regions shown by "ECO" in the drawing) of time slots which are reserved and set to the energy saving mode are, for example, colored, and displayed along the time axis, to be distinguished from another region.

The setting contents of the operation of each device 50 in the energy saving mode may be allowed to be referenced through display of a separate screen by pressing a detail check button 124. This screen will be described in an example embodiment to be described later.

Figure 6:
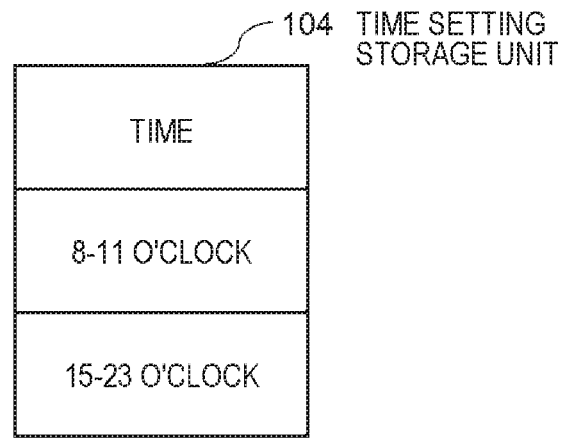
FIG. 6 is a diagram illustrating an example of a data structure of a time setting storage unit of the information processing apparatus according to the example embodiment of the present invention.

FIG. 6 is a diagram illustrating an example of a data structure of a time setting storage unit 104 of the information processing apparatus 100 according to the example embodiment of the present invention.

Times (8-11 o'clock and 15-23 o'clock) to turn on the energy saving mode which are accepted by the mode setting acceptance unit 102 are stored in the time setting storage unit 104.

As another example, the time setting storage unit 104 may store the presence or absence of a mode setting for each of the times.

In the configuration of the present example embodiment in which the entire configuration of the information processing apparatus 100 of FIG. 1 is implemented by the HEMS 40, the time setting storage unit 104 is implemented by the memory 64 or the storage 66 of the computer 60 constituting the HEMS 40.

In a configuration in which the information processing apparatus 100 includes at least the server apparatus 30 (cloud server 34), the time setting storage unit 104 may be implemented by a database of the cloud server 34, and time setting information may be stored for each consumer with respect to a plurality of consumers.

Referring back to FIG. 1, the execution unit 103 monitors the clock (not shown) or the like of the HEMS 40 for the set time of a mode. The execution unit 103 monitors whether the current time corresponds to a time stored in the time setting storage unit 104, accesses the device setting storage unit 110 at the set time, and reads out the operation contents of a plurality of devices determined in advance for the mode.

The operation of the ECHONET Lite authentication device or the like is automatically controlled by the execution unit 103 through the HEMS 40 in accordance with the read-out operation contents. In a case where the device is not adaptable to perform automatic control, the execution unit 103 notifies a consumer of the setting operation contents or the setting operation method of the device to allow the consumer to manually operate the devices. The notification method is not particularly limited. For example, a notification that the setting change time will soon arrive and, in addition, a notification of the setting operation contents or method may be displayed on a display unit of the HEMS 40 or the operating terminal 80, and the same contents (such as the notification, operation contents, or operation method) may be transmitted to the user terminal through an email. The time for notifying a consumer may be appropriately set, for example, to a plurality of times such as, for example, an hour or ten minutes before the time to change a mode. In this case, the execution unit 103 monitors the set notification time, and reads out the operation contents of the device at the set time.

An information processing method of the information processing apparatus 100 of the present example embodiment configured in this manner will be described below.

Figure 7:
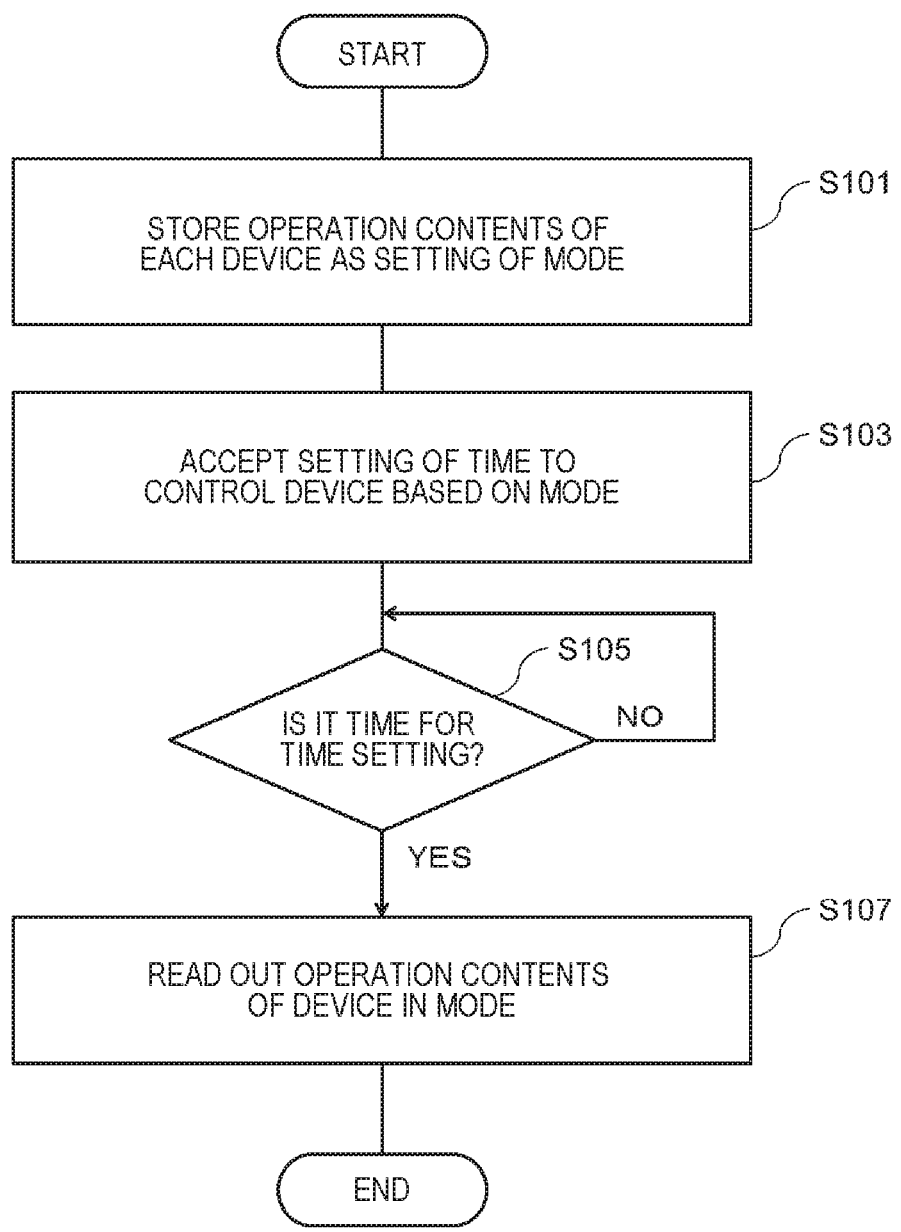
FIG. 7 is a flow diagram illustrating an example of the operation of the information processing apparatus according to the example embodiment of the present invention.

FIG. 7 is a flow diagram illustrating an example of the operation of the information processing apparatus 100 of the present example embodiment.

As described above, since the information processing apparatus 100 of the present invention is considered to have a plurality of configuration examples, apparatuses (computers) that execute each procedure of the information processing method or combinations of the apparatuses are different from each other for each configuration example, and the execution of each procedure of the information processing method by any of the apparatuses (computers) is considered to have various forms.

For example, in the configuration in which the information processing apparatus 100 is implemented by the HEMS 40, the information processing method of the present invention is an information processing method of the HEMS 40, and an information processing method executed by a computer that implements the HEMS 40. In addition, in the configuration in which the information processing apparatus 100 is implemented by a combination of the HEMS and the server apparatus 30, the information processing method of the present invention is an information processing method of the HEMS 40 and the server apparatus 30, and an information processing method executed by a computer that implements the HEMS 40 and a computer that implements the server apparatus 30.

In an embodiment in which the information processing apparatus 100 is implemented by the HEMS 40, an application program for implementing the information processing apparatus 100 is installed in the HEMS 40 and is started up, thereby allowing the HEMS 40 to execute the procedure of the information processing method of the information processing apparatus 100. In an embodiment in which the information processing apparatus 100 is implemented by a combination of the HEMS 40 and the server apparatus 30, a user performs user registration or the like for using the service of the information processing apparatus 100 beforehand, and performs a setting of communication connection between the HEMS 40 and the server apparatus 30.

In addition, in an embodiment in which the operating terminal 80 or the user terminal is used as operating terminals together with the HEMS 40 or the server apparatus 30, an application program for implementing a user interface function of the information processing apparatus 100 is also installed in these terminals and is started up, thereby allowing the operating terminal 80 or the user terminal to execute at least a portion of the procedure of the information processing method of the information processing apparatus 100. In the present example embodiment, the information processing apparatus 100 implemented by the HEMS 40 will be described.

The information processing method according to the example embodiment of the present invention is an information processing method of the information processing apparatus 100 (HEMS 40 in the present example embodiment) executed by the computer 60 that implements the information processing apparatus 100.

The information processing method of the present example embodiment includes execution for causing the information processing apparatus 100 (HEMS 40 in the present example embodiment) to accept the setting of a time to control a plurality of devices on the basis of at least one mode in which the operation contents of the plurality of devices are set (step S103), and to output the operation contents of the plurality of devices at the set time (YES in step S105) (step S107).

More specifically, in the information processing apparatus 100 (HEMS 40), the operation contents of each device 50 of a consumer are stored in the device setting storage unit 110, for example, as the setting of the energy saving mode (step S101).

Information of each device 50 of the consumer is registered with the HEMS 40 (device setting storage unit 110) in advance by the consumer, or is acquired by the HEMS 40 performing communication with the ECHONET Lite authentication device, and is registered with the HEMS (device setting storage unit 110).

A consumer performs a setting operation to set a time to turn on the energy saving mode of operation contents determined in advance in step S101, and the mode setting acceptance unit 102 accepts the time setting (step S103).

The time setting accepted in step S103 is stored in the time setting storage unit 104.

Whether the current time is a time at which a mode is set is determined by the clock of the HEMS 40 (step S105). At the set time of the energy saving mode (YES in step S105), the execution unit 103 accesses the device setting storage unit 110, and reads out the operation contents of a plurality of devices determined in advance (step S107). In addition to a time set to the energy saving mode, the time to be monitored in step S105 may be a time, such as an hour before the set time, which is set in advance.

The execution unit 103 automatically controls a plurality of devices in accordance with the read-out operation contents of the plurality of devices, or notifies a consumer of the setting operation contents of the plurality of devices.

As described above, in step S103, the mode setting acceptance unit 102 accepts the setting of a time to transition to the energy saving mode, and stores the setting in the time setting storage unit 104 in association with the mode. Alternatively, the display screen (not shown) of the operating terminal 80 or the like may be provided with an operation button or an icon for allowing transition to the energy saving mode, and transition to the energy saving mode may be simply performed from the time of accepting the operation by the operation button or the icon.

For example, when going out or when a demand response is received, a consumer may press the mode transition button (not shown) on the display screen of the user terminal or the operating terminal 80 to switch to the energy saving mode. When a mode cancel operation is accepted, a configuration may be used in which the energy saving mode is cancelled after a predetermined time has elapsed, or when a predetermined condition is satisfied. Examples of the predetermined condition include the amount of power saving reaching a target value, termination of a request period of a demand response, the outside air temperature of equal to or higher than a predetermined value due to an extremely hot day or the like as described later, and the like.

As described above, in the information processing apparatus 100 of the present example embodiment, the mode setting acceptance unit 102 accepts the setting of a time to turn on at least one mode, in which the operation contents of a plurality of devices are set, for suppressing the amount of power consumed by a consumer, and reads out the operation contents of the plurality of devices at the set time.

In this manner, according to the information processing apparatus 100 of the present example embodiment, by simply setting a time to turn on a mode (for example, energy saving mode) in which the operation contents of a plurality of devices are set in advance, the devices can be transitioned to an appropriate operation setting that makes it possible to suppress the amount of power consumption. Therefore, in a case where the devices can be automatically controlled, there is no need to perform the setting of each device. In addition, even in a case where a device is not adaptable to automatic control, since appropriate setting contents of each device are presented, the setting operation can be easily performed. In this manner, according to the present example embodiment, it is possible to suppress the amount of power consumption by a simple operation and with good efficiency.

Second Example Embodiment

Next, an information processing apparatus, an information processing method and a program according to a second example embodiment of the present invention will be described below. The information processing apparatus of the present example embodiment is different from that of the above example embodiment, in that the information processing apparatus includes a configuration allowing to display or change the operation contents in a setting mode for each device.

Figure 8:
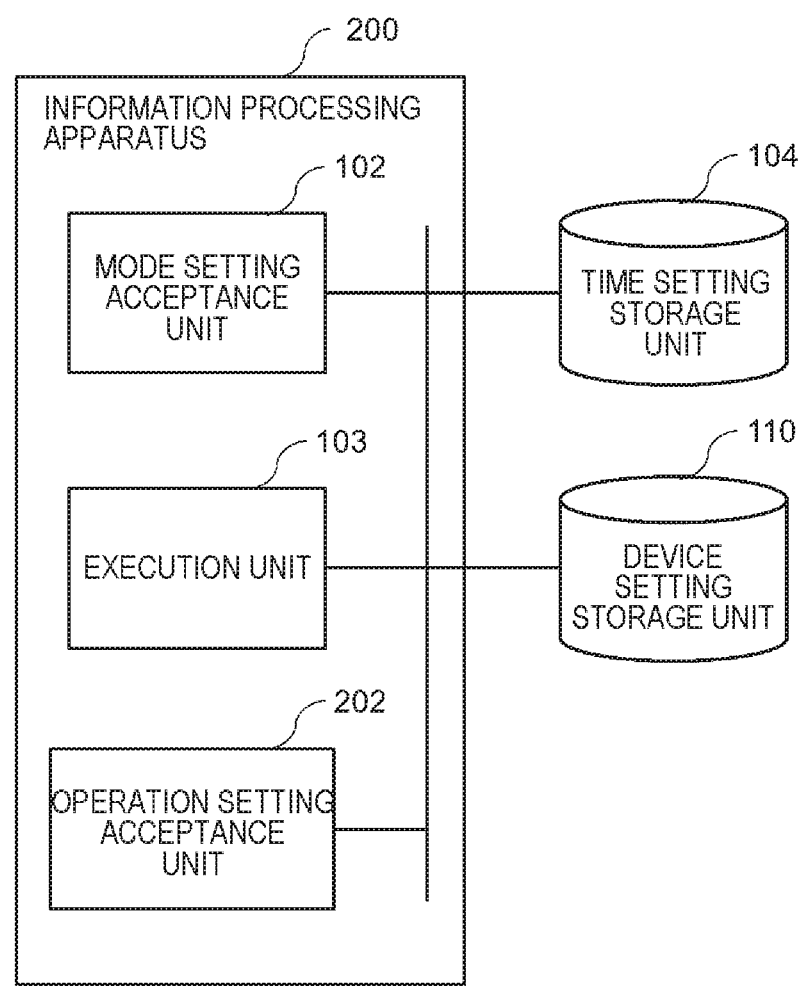
FIG. 8 is a functional block diagram logically illustrating a configuration of the information processing apparatus according to the example embodiment of the present invention.

FIG. 8 is a functional block diagram logically illustrating a configuration of an information processing apparatus 200 according to the example embodiment of the present invention.

The information processing apparatus 200 of the present example embodiment includes the mode setting acceptance unit 102 and the execution unit 103 which are the same as those of the information processing apparatus 100 of FIG. 1, and further includes an operation setting acceptance unit 202.

The operation setting acceptance unit 202 accepts the setting of the operation contents of each device 50 for each mode.

For example, when the detail check button 124 on the screen 120 of FIG. 5 of the example embodiment is pressed, detailed information of the operation contents of each device 50 specified in the energy saving mode is displayed.

FIG. 9 is a diagram illustrating an example of a display screen 210 of the operation contents of each device 50 specified in the energy saving mode in the information processing apparatus 200 according to the example embodiment of the present invention.

The screen 210 of FIG. 9 includes a device information display unit 212. As described above, when the detail check button 124 of FIG. 5 is pressed, the screen 210 may be displayed.

The device information display unit 212 includes a consumer's device information display column 214 (shown by "household electric appliances" in the drawing), a control contents display column 216 of each device, and a power saving amount display column 218.

A list of devices in the consumer's home is displayed in a tabulated list format on the device information display unit 212. For each device 50 of the consumer, the list of devices includes identification information such as its name, control contents, and the amount of power saving allowing to save power by adjustments to the control contents.

The consumer device information 112 registered with the consumer device setting storage unit 110 is displayed in the device information display column 214. In addition, a common name (such as "living room air conditioner" or "bedroom air conditioner") or the like arbitrarily registered by the user which is associated with the consumer device information 112 may be displayed in the device information display column 214.

All of the plurality of devices 50 used by the consumer are not required to be displayed on the device information display unit 212, and only devices capable of suppressing the amount of power consumption may be selected and displayed. Alternatively, a configuration (user interface (such as, for example, a check box)) may be included in which the selection of a device to be displayed by a consumer is accepted. In addition, the device information display unit 132 may be further provided with a selection field (not shown) of a device to be controlled, and may include, for example, a configuration (user interface (such as, for example, a check box)) in which the selection of whether each device 50 is controlled is accepted.

Control contents of each device 50 in the energy saving mode stored in the control contents 114 in the device setting storage unit 110 are displayed in the control contents display column 216.

In addition, the operation setting acceptance unit 202 may accept a setting using a graphical user interface (GUI) allowing to change the adjustment value of the control contents of the device 50, on the screen 210 of FIG. 9. For example, various UIs may be used such as a so-called picker allowing to select numerical values displayed on a rotating cylinder, a so-called stepper allowing to increase or decrease numerical values through a plus or minus operation button, and a slider allowing to change numerical values by moving the slider on a scale. The operation setting acceptance unit 202 may accept the adjustment value of the device 50 changed by a UI operation as operation contents.

The control contents 114 in the device setting storage unit 110 may be updated in the changed operation contents.

The value of the amount of power saving (difference between the amounts of power consumption before and after control) in a case where each device 50 is controlled in accordance with the control contents of the control contents display column 216 is displayed in the power saving amount display column 218. Specifically, the value of the saved power amount 116 in the device setting storage unit 110 is displayed. Thereby, when the mode is set to the energy saving mode, a consumer can specifically know how much power saving is attainable.

As described above, in a case where the setting contents of the device are manually adjusted by a consumer, the operation setting acceptance unit 202 accepts the setting of operation contents, and the value of the amount of power saving may be re-calculated in accordance with the operation contents to update the display of the power saving amount display column 218. In addition, the value of the saved power amount 116 in the device setting storage unit 110 may also be updated.

In addition, in the example of FIG. 9, the amount of power saving is displayed. However, the amount of power consumption or an electricity rate in a case where each device 50 is controlled in the control contents of the control contents display column 216 may also be displayed. In addition, the amounts of power consumption or electricity rates before and after control may be displayed.

In the example of FIG. 9, the control contents of each device 50 are displayed by values relative to the current values, but may be displayed by absolute values as shown in FIG. 10. A device information display unit 222 includes a current value display column 224 for displaying a current set value, a control contents display column 226 for displaying a set value after control, and a power saving amount display column 228, in addition to the device information display column 214.

A value indicating the state of each device 50 at the present point in time which is displayed in the current value display column 224 may be, for example, acquired from the ECHONET Lite authentication device, analyzed and acquired using a device separation technique from the amount of power acquired by the CT, or acquired using a smart tap or the like.

In this example, the HEMS 40 may collect the current value of each device 50, and display the value. In addition, these pieces of information may be stored in the device setting storage unit 110.

In addition, an operating state information acquisition unit (not shown) may be included which acquires a history of the operating state of each device 50 of a consumer. On the basis of the acquired history, the execution unit 103 may display predicted values indicating the operation contents of the device 50 of the consumer, for example, during an execution target period of a demand response, that is, a period (set time of a mode) in which the amount of power consumption is desired to be suppressed. In addition, the amount of power consumption calculated from the operation contents of the device 50 may be displayed. These pieces of information may also be stored in the device setting storage unit 110.

An information processing method of the information processing apparatus 200 of the present example embodiment configured in this manner will be described below.

Similarly to the information processing method of the information processing apparatus 100 of the above example embodiment, in the information processing method of the information processing apparatus 200 of the present example embodiment, the execution of each procedure of the information processing method by any of the apparatuses through a combination of the apparatuses constituting the information processing apparatus 200 is considered to have various forms.

The information processing method of the present example embodiment is an information processing method of the information processing apparatus 200, and is an information processing method executed by the computer 60 that implements the information processing apparatus 200.

The information processing method of the present example embodiment includes causing the information processing apparatus 200 to accept the setting of the operation contents of each device 50 for each mode (not shown).

The accepted setting is stored in the device setting storage unit 110.

In addition, the computer program of the present example embodiment may be a program causing at least one computer 60 to execute the information processing method of the present example embodiment, and may be a computer readable storage medium having such a program stored therein. This storage medium includes a non-transitory tangible medium.

When such a computer program is executed by a computer, the computer program includes computer program codes causing the computer to carry out an information processing method on the information processing apparatus 200.

As described above, the information processing apparatus of the present invention is considered to have a plurality of configuration examples, and the program 90 for implementing the information processing apparatus is executed by at least one computer 60. Computers that execute each procedure of a program are different from each other for each configuration example, and the execution of each procedure of a program by any of the computers is considered to have various forms.

The computer program of the present example embodiment is described so as to cause the computer 60 for implementing the information processing apparatus 200 to execute a procedure of accepting the setting of the operation contents of each device 50 for each mode.

As described above, in the information processing apparatus 200 of the present example embodiment, the setting of the operation contents of each device 50 is accepted by the operation setting acceptance unit 202 for each mode, and thus a consumer can easily adjust or change the setting of the operation contents of each device 50. In addition, since the operation contents of each device 50 in the energy saving mode can be checked in a tabulated list, a consumer can specifically know the setting contents or setting method of each device 50 for implementing energy saving. Further, in the information processing apparatus 200, since the setting or control contents of each device 50 can be manually changed by a consumer, superior convenience is provided. Further, since the amount of power saving, an electricity rate and the like are also displayed based on the operation contents of each device 50 during mode setting, the effect of power saving may be easily understood, and thus a consumer may be motivated to perform mode setting.

Third Example Embodiment

Next, an information processing apparatus, an information processing method and a program according to a third example embodiment of the present invention will be described below. The information processing apparatus of the present example embodiment is different from those of the above example embodiments, in that the information processing apparatus includes a configuration that accepts the setting of a plurality of modes according to the time slot.

Figure 11:
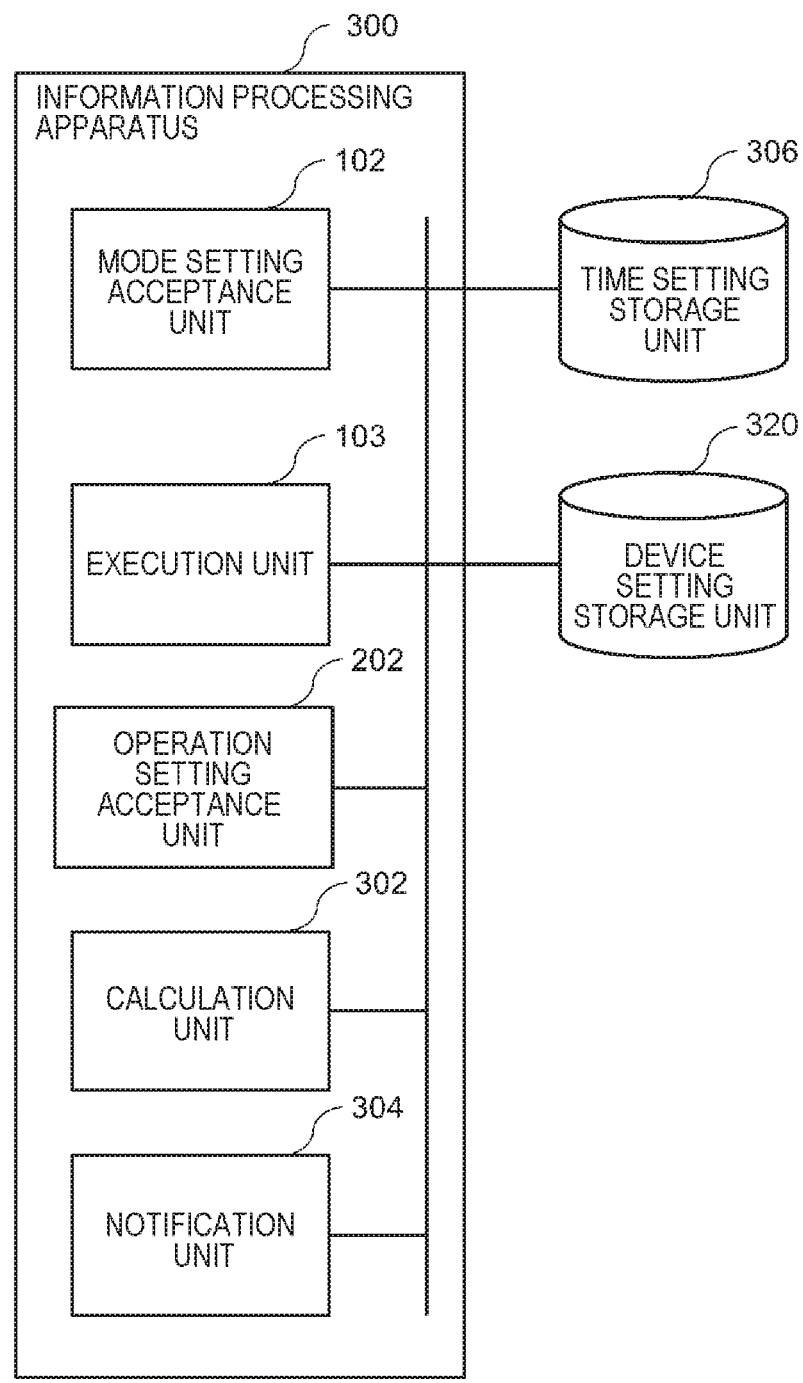
FIG. 11 is a functional block diagram logically illustrating a configuration of the information processing apparatus according to the example embodiment of the present invention.

FIG. 11 is a functional block diagram logically illustrating a configuration of an information processing apparatus 300 according to the example embodiment of the present invention.

The information processing apparatus 300 of the present example embodiment includes the mode setting acceptance unit 102, the execution unit 103, and the operation setting acceptance unit 202 which are the same as those of the information processing apparatus 200 of the above example embodiment of FIG. 8, and further includes a calculation unit 302 and a notification unit 304.

The information processing apparatus 300 further includes a configuration that prevents a setting error so that the setting of a plurality of modes is appropriately performed, in the configuration of the above example embodiment.

In the present example embodiment, there are a plurality of modes in which the total amounts of power consumed by a consumer are different from each other. For example, there are three modes including a first mode (hereinafter, called the ECO 1 mode) in which the amount of power saving is equal to or greater than a first predetermined value, a second mode (hereinafter, called the ECO 2 mode) in which the amount of power saving is equal to or greater than a second predetermined value (the second predetermined value is less than the first predetermined value) and less than the first predetermined value, and a third mode (hereinafter, called the normal mode) in which the amount of power saving is less than the second predetermined value or operation contents are not specified.

That is, the ECO 1 mode is a mode having a higher power saving effect than the ECO 2 mode.

In the present example embodiment, the mode setting acceptance unit 102 accepts the selection of a mode to be set according to the time slot, from among a plurality of modes.

Figure 12A:
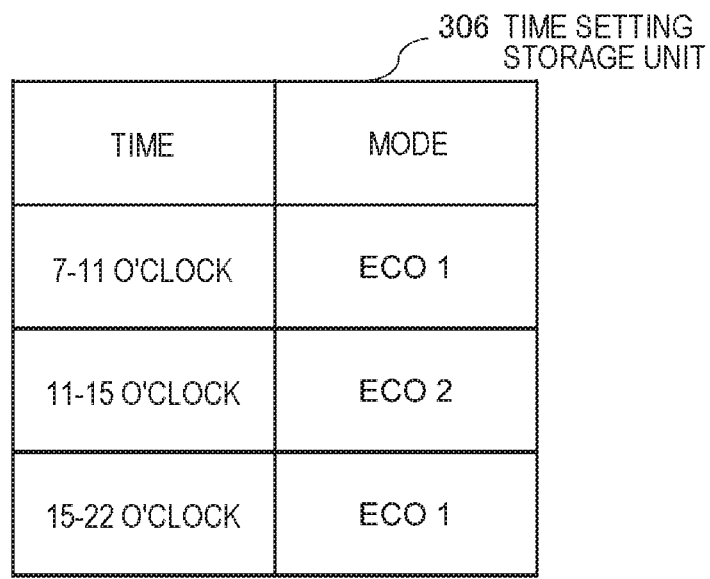
FIGS. 12A and 12B are diagrams each illustrating an example of a data structure of the time setting storage unit of the information processing apparatus of the present example embodiment.
Figure 12B:
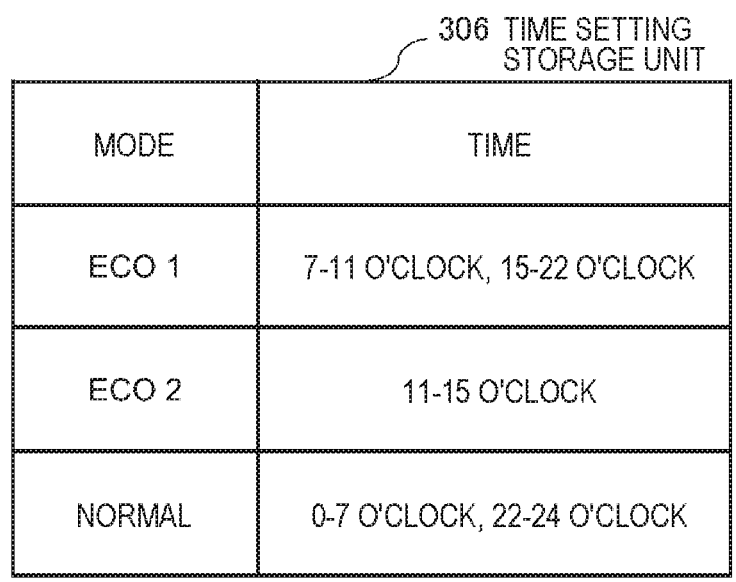

FIGS. 12A and 12B are diagrams each illustrating an example of a data structure of a time setting storage unit 306 of the information processing apparatus 300 of the present example embodiment.

Settings accepted by the mode setting acceptance unit 102 are stored in the time setting storage unit 306 shown in FIGS. 12A and 12B. In the example of FIG. 12A, a mode to be set during 7-11 o'clock and 15-22 o'clock is the ECO 1 mode, and a mode to be set during 11-15 o'clock is the ECO 2 mode. These modes are stored in the time setting storage unit 306.

In the example of FIG. 12B, for each mode, time slots to turn on the modes are stored in association with each other.

Figure 13:
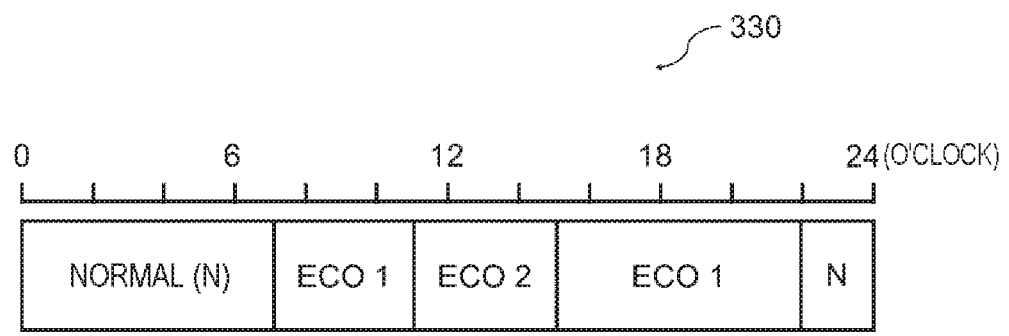
FIG. 13 is a diagram illustrating an example of a screen displaying the information processing apparatus according to the example embodiment of the present invention on the operating terminal.

In the example of a screen 330 of FIG. 13, the set time of each mode stored in the time setting storage unit 306 is displayed.

A method of setting each mode is considered in various ways, and is exemplified below, but there is no limitation thereto.

For example, as in the screen 330 of FIG. 13, the modes are selected and set for each period of time, and as in the time setting storage unit 306 of FIG. 12A, the modes are stored in association with the time slots.

Alternatively, for each mode, a time to turn on the mode may be selected and set, and stored by associating a time slot with a mode, as in the time setting storage unit 306 of FIG. 12B.

In addition, in a case where a period of time is selected and set for each mode, and there is an overlap in the set time, a mode to be preferentially set may be specified in advance and automatically set as a priority mode. Alternatively, in a case where there is an overlap in the set time, a configuration in which a user is notified of the overlapped setting and is urged to change the setting, or a configuration in which the overlapped setting is not accepted may be adopted.

As is the case with the example embodiment, in a configuration in which the entire configuration of the information processing apparatus 300 of FIG. 11 is implemented by the HEMS 40, the time setting storage unit 306 is implemented by the memory 64 or the storage 66 of the computer 60 constituting the HEMS 40.

In the configuration in which the information processing apparatus 300 includes at least the server apparatus 30 (cloud server 34), the time setting storage unit 306 may be implemented by a database of the cloud server 34, and time setting information may be stored for each of a plurality of consumers.

In addition, as is the case with the above example embodiment, the information processing apparatus 300 of the present example embodiment is also considered to have both a configuration in which a time to turn on a mode is reserved and set in advance and a configuration in which transition to a mode is performed by a manual operation at a point in time desired to turn on the mode. The latter configuration in which a mode setting is performed by pressing a mode transition button or the like will be described below.

Figure 14:
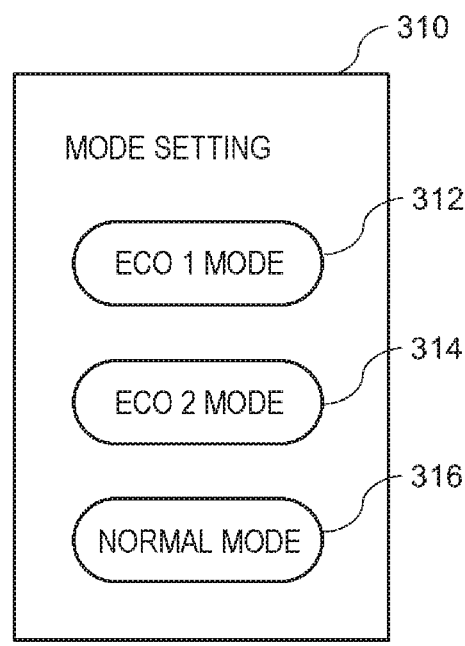
FIG. 14 is a diagram illustrating an example of a mode setting screen of the information processing apparatus of the present example embodiment.

FIG. 14 is a diagram illustrating an example of a mode setting screen 310 of the information processing apparatus 300 of the present example embodiment.

In this example, the mode setting screen 310 includes an operation button 312 for allowing transition to the ECO 1 mode, an operation button 314 for allowing transition to the ECO 2 mode, and an operation button 316 for allowing transition to the normal mode.

The mode setting acceptance unit 102 performs transition to the ECO 1 mode when pressing of the operation button 312 is accepted, transition to the ECO 2 mode when pressing of the operation button 314 is accepted, and transition to the normal mode when pressing of the operation button 316 is accepted.

The normal mode is a mode that is not the ECO 1 mode or the ECO 2 mode, and is a mode in which no special control is performed for suppressing the amount of power consumption.

A cancel operation after mode transition is the same as that in the example embodiment. A configuration may be adopted for cancelling a currently-set mode when a mode cancel operation is accepted, when an operation button of another mode is pressed, after a predetermined time has elapsed, or when a predetermined condition is satisfied. After mode cancellation, a change to the normal mode is performed. Examples of the predetermined condition include an amount of power saving reaching a target value, termination of a request period of a demand response, the outside air temperature of equal to or higher than a predetermined value due to an extremely hot day or the like, as to be described later, and the like.

FIGS. 15A and 15B are diagrams each illustrating an example of a data structure of a device setting storage unit 320 of the information processing apparatus 300 of the present example embodiment.

FIG. 15A is an example of the setting of the operation contents of each device in the ECO 1 mode, and FIG. 15B is an example of the setting of the operation contents of each device in the ECO 2 mode. The device setting storage unit 320 stores setting information of each mode.

A method of setting the operation contents of each mode is the same as that in the example embodiment. In addition, the setting contents of the operation contents of each mode may be displayed on a screen as is the case with the above example embodiment, and may be able to be checked or changed.

As described above, in the present example embodiment, it is assumed that the amount of power saving in the ECO 1 mode is larger than the amount of power saving in the ECO 2 mode. The wording "the amount of power saving in the ECO 1 mode is larger than that in the ECO 2 mode" indicates that the amount of power consumption in the ECO 1 mode 1 is smaller than that in the ECO 2 mode. However, in the present example embodiment, since a consumer may manually change the operation contents of each device of each mode, as a result of changing the setting, there may be a possibility of the ECO 2 mode becoming larger in the amount of power saving than the ECO 1 mode.

Consequently, in the present example embodiment, the information processing apparatus 300 further includes the ECO 1 mode and the ECO 2 mode which is higher in the total amount of power consumed by the devices than the ECO 1 mode (in other words, ECO 2 mode is smaller in the amount of power saving than the ECO 1 mode), and includes a configuration of detecting that the total amount of power consumption which is calculated on the basis of the setting of the operation contents of the device for each mode is higher in the ECO 1 mode than in the ECO 2 mode (in other words, the amount of power saving is lower in the ECO 1 mode than in the ECO 2 mode), and a user is notified to that effect.

As shown in FIG. 11, the information processing apparatus 300 of the present example embodiment includes the calculation unit 302 and the notification unit 304.

The calculation unit 302 calculates the total amount of power consumption for each mode on the basis of the accepted setting of the operation contents of the device for each mode. The notification unit 304 gives notice to a user in a case where the calculated total amount of power consumed by the devices in the ECO1 mode is larger than the calculated total amount of power consumed by the devices in the ECO 2 mode, on the basis of the operation contents of the device for each mode. In other words, the notification unit gives notice to a user in a case where the total amount of power saving in the ECO 1 mode is smaller than the total amount of power saving in the ECO 2 mode.

FIGS. 15A and 15B are diagrams each illustrating a mode-specific setting example of the device setting storage unit of the present example embodiment.

For example, in the example of FIG. 15A, the total amount of power saving calculated by the calculation unit 302 on the basis of the setting of the control contents of each device in the ECO 1 mode of the device setting storage unit 320 is 4.5 kWh. In addition, in the example of FIG. 15B, the total amount of power saving calculated by the calculation unit 302 on the basis of the setting of the control contents of each device in the ECO 2 mode of the device setting storage unit 320 is 3.2 kWh.

Since the calculated total amount of power saving in the ECO 2 mode is smaller than the total amount of power saving in the ECO 1 mode, the notification unit 304 does not perform notification.

On the other hand, in a case where a consumer changes the control contents of each device in the ECO 1 mode and the ECO 2 mode, or changes the selection of a device to be controlled, and the total amount of power saving calculated by the calculation unit 302 becomes larger in the ECO 2 mode than in the ECO 1 mode, the notification unit 304 notifies a user to that effect.

A notification method may be considered in various ways, and is exemplified below, but there is no limitation thereto. In addition, the following multiple contents may be combined.

(b1) During an operation of changing the adjustment value of a device or during an operation of selecting a device to be controlled, a message for urging a user to change the setting or selection or a message for notifying of a setting error or a selection error is displayed on the operation screen.

(b2) During an operation of changing the adjustment value of a device or during an operation of selecting a device to be controlled, emphasis display (such as blinking display, color changing display, or magnified display) of the adjustment value, the selection field, or the amount of power saving is performed.

(b3) Setting error display (LED indicator or liquid crystal indicator) is performed on the indicator of the HEMS 40.

(b4) A message for urging a user to change the setting or selection or a message for notifying a user of a setting error or a selection error is transmitted to the operating terminal 80 or the user terminal through an email.

(b5) A message for urging a user to change the setting or selection or a message for notifying a user of a setting error or a selection error is displayed on a user-dedicated web site.

(b6) During an operation of changing the adjustment value of a device or an operation of selecting a device to be controlled, a restriction is imposed on the operation of the GUI of the operation screen so that only values or ranges that can be set or selected can be set or selected, and thus a user is notified that a setting cannot be performed for values or ranges not allowed to be set.

An information processing method of the information processing apparatus 300 of the present example embodiment configured in this manner will be described below.

Similarly to the information processing method of the information processing apparatus 100 or the information processing apparatus 200 of the above example embodiments, in the information processing method of the information processing apparatus 300 of the present example embodiment, the execution of each procedure of the information processing method by any of the apparatuses through a combination of the apparatuses constituting the information processing apparatus 300 is considered to have various forms.

The information processing method of the present example embodiment is an information processing method of the information processing apparatus 300, and is an information processing method executed by the computer 60 that implements the information processing apparatus 300.

The information processing method of the present example embodiment includes causing the information processing apparatus 300 to accept the selection of a mode to be set according to the time slot, from among a plurality of modes.

The accepted setting is stored as that of the corresponding mode in the device setting storage unit 320.

Further, the information processing method of the present example embodiment includes causing the information processing apparatus 300 to calculate the total amount of power consumption for each mode on the basis of the accepted setting of the operation contents of the device for each mode, and giving notice to a user in a case where the calculated total amount of power consumed by the devices in the ECO1 mode is larger than the calculated total amount of power consumed by the devices in the ECO 2 mode, on the basis of the operation contents of the device for each mode.

In addition, the computer program of the present example embodiment may be a program causing at least one computer 60 to execute the information processing method of the present example embodiment, and may be a computer readable storage medium having such a program stored therein. This storage medium includes a non-transitory tangible medium.

When such a computer program is executed by a computer, the computer program includes computer program codes causing the computer to carry out an information processing method on the information processing apparatus 300.

As described above, the information processing apparatus of the present invention is considered to have a plurality of configuration examples, and the program 90 for implementing the information processing apparatus is executed by at least one computer 60. Computers that execute each procedure of a program are different from each other for each configuration example, and the execution of each procedure of a program by any of the computers is considered to have various forms.

The computer program of the present example embodiment is described so as to cause the computer 60 for implementing the information processing apparatus 300 to execute a procedure of accepting the selection of a mode to be set according to the time slot, from among a plurality of modes.

Further, the computer program of the present example embodiment is described so as to cause the computer 60 for implementing the information processing apparatus 300 to execute a procedure of calculating the total amount of power consumption for each mode on the basis of the accepted setting of the operation contents of the device for each mode, and a procedure of giving notice to a user in a case where the calculated total amount of power consumed by the devices in the ECO1 mode is larger than the calculated total amount of power consumed by the devices in the ECO 2 mode, on the basis of the operation contents of the device for each mode.

As described above, in the information processing apparatus 300 according to the example embodiment of the present invention, since the selection of a mode to be set according to the time slot can be accepted by the mode setting acceptance unit 102 from among a plurality of modes, the amount of power consumption can be efficiently reduced just by a simple operation of performing the time settings of a plurality of modes in which the operation contents of each device are set in advance.

In addition, in a case where a power saving effect appropriate to a mode cannot be obtained due to a setting error when the setting contents (such as the operation contents of the device) of each mode are manually changed, notice is given to a consumer by the notification unit 304, and thus it is possible to prevent the setting error from occurring.

Fourth Example Embodiment

An information processing apparatus according to a fourth example embodiment of the present invention is different from those of the above example embodiment, in that the information processing apparatus includes a configuration in which the operation contents of a device according to the air temperature are set. The information processing apparatus of the present example embodiment may be combined with the configuration of any one of the information processing apparatuses of the above example embodiments.

It is assumed that the present example embodiment includes the same configuration as that of the information processing apparatus 100 of FIG. 1.

In the present example embodiment, the operation contents of a device according to the air temperature are further set for each mode.

The air temperature indicates information such as the air temperature of a region of a consumer's home (outside air or room temperature) or the air temperature on an extremely hot summer day (also including forecast information such as a warning or an alarm). The air temperature information may be acquired from, for example, a temperature sensor within a consumer's home, and may be acquired from a provider or the like that provides predetermined weather information through the Internet or the like.

In the present example embodiment, as a method of setting the operation contents of a device according to the air temperature, at least the following two methods may be considered:

(c1) selecting (changing) the operation contents of a device on condition of the air temperature; and (c2) changing the mode during a time slot (or cancelling the mode setting) on condition of the air temperature.

In a case of (c1), pieces of setting information including a plurality of operation contents different from each other which are set in accordance with the air temperature are stored in a device setting storage unit 410.

In a case of (c2), pieces of time setting information of modes which are set in accordance with the air temperature are stored in the time setting storage unit 306.

In a configuration of the present example embodiment in which the entire configuration of the information processing apparatus is implemented by the HEMS 40, the device setting storage unit 410 or the time setting storage unit 306 is implemented by the memory 64 or the storage 66 of the computer 60 constituting the HEMS 40.

In a configuration in which the information processing apparatus includes at least the server apparatus 30 (cloud server 34), the device setting storage unit 410 or the time setting storage unit 306 may be implemented by a database of the cloud server 34, and mode-specific device information may be stored with respect to a plurality of consumers.

As to be described later, the operation contents or time setting of each device 50 may also be appropriately changed.

FIGS. 16A and 16B are diagrams each illustrating an air temperature condition-specific setting example of the device setting storage unit 410 of an information processing apparatus 400 of the present example embodiment.

In this example, settings for changing the operation contents of each mode (here, energy saving mode) are determined in advance in accordance with the air temperature. FIG. 16A shows an example of device setting information, stored in the device setting storage unit 410, which is used in a case where the air temperature is lower than a predetermined value. FIG. 16B shows an example of device setting information, stored in the device setting storage unit 410, at the time of high temperatures with the air temperature of equal to or higher than a predetermined value (for example, in a case where outside air is equal to or higher than 35° C.).

In the examples of FIGS. 16A and 16B, control contents 414 are indicated by an absolute value, and a current value 412 is also included.

Further, in the example of FIG. 16B at the time of high temperatures, second operation contents (in which the set temperature of an air conditioner is 29° C.) in a case where the air temperature is lower than a predetermined value (35° C.) may be provided, in addition to first operation contents (in which the set temperature of an air conditioner is 27° C.) at the time of high temperatures with the air temperature of equal to or higher than a predetermined value (for example, in a case where outside air is equal to or higher than 35° C.). The execution unit 103 may switch the operation contents (first operation contents and second operation contents) in accordance with the air temperature in the energy saving mode.

In contrast to the above, the first operation contents at the time of high temperature with the air temperature of equal to or higher than a predetermined value (for example, in a case where outside air is equal to or higher than 35° C.) may be "set temperature setting of air conditioner to 29° C.", and the second operation contents in a case where the air temperature is lower than a predetermined value may be "set temperature setting of air conditioner to 27° C.".

That is, control may be performed for automatically changing the setting of an air conditioner on the basis of a result of comparison between the air temperature and a predetermined value.

Specifically, in the former example, there is an effect of preventing the set temperature of an air conditioner from being set excessively high only for power saving on an extremely hot day or the like. In the latter example, a cooling effect may be maintained even when the set temperature of an air conditioner is set high since the reference temperature increases in a case where the air temperature is higher than a predetermined value. In addition, reversely, since the need for cooling is not high in a case where the air temperature is lower than a predetermined value, the set temperature of an air conditioner may also be set high.

The above settings may be appropriately set by a user as necessary.

As described above, not only the first operation contents or the second operation contents may be selected on the basis of whether the temperature is equal to or higher than a predetermined temperature or equal to or lower than the predetermined temperature, but also the first operation contents or the second operation contents may be selected on the basis of information such as the season or the month. For example, specifically, the first operation contents may be selected in the summer such as June to August, and the second operation contents may be selected in the winter such as December to February.

In addition, the change of operation contents according to the air temperature, the season or the like may be performed for each device.

In addition, a control unit (not shown) that changes a setting of a mode in accordance with the air temperature may be further included. For example, in a case where information on an extremely hot summer day or the like is acquired, or in a case where the air temperature exceeds a predetermined value, and the energy saving mode is set at the corresponding time (in which, for example, the set temperature of an air conditioner is raised by 3° C.), the control unit may cancel the mode setting (energy saving mode) at that time. After the mode cancellation, a change to the normal mode is performed. Alternatively, the control unit may perform, for example, an automatic change to another mode (for example, from ECO 1 mode of +3° C. to ECO 2 mode of +1° C.) in which change in the temperature setting of an air conditioner is reduced.

In addition, for example, in a case where information on a midwinter day is acquired, or in a case where the lowest air temperature is equal to or lower than a predetermined value, and the energy saving mode is set at the corresponding time (in which, for example, the set temperature of an air conditioner is lowered by 3° C.), the control unit may cancel the mode setting (energy saving mode) at that time. After the mode cancellation, a change to the normal mode is performed. Alternatively, the control unit may perform, for example, a change to another mode (for example, from ECO 1 mode of −3° C. to ECO 2 mode of −1° C.) in which change in the temperature setting of an air conditioner is reduced.

FIG. 17 is a diagram illustrating an example of a data structure of the time setting storage unit 306 of the information processing apparatus of the present example embodiment.

In the example of FIG. 17, for example, time setting information at the time of high temperatures at which outside air is equal to or higher than 35° C. is stored. On the other hand, in the examples of FIGS. 12A and 12B, for example, a time setting during a normal time at which the outside air is lower than 35° C. is stored in the time setting storage unit 306.

In FIGS. 12A and 12B, the period of 11-15 o'clock is set to the ECO 2 mode. However, in FIG. 17, at 11-15 o'clock, the setting of the ECO 2 mode is cancelled, and is changed to the normal mode.

The information processing apparatus may automatically perform control of a mode change on the basis of a result of comparison between the air temperature and the predetermined value. In addition, a mode may be changed on the basis of control by a user.

For example, in a case where the air temperature becomes higher than a predetermined value (35° C.), the mode may be changed in the direction of decreasing the amount of power saving. Specifically, the mode setting of the ECO 2 mode is cancelled to change to the normal mode, and the ECO 1 mode is changed to the ECO 2 mode. Similarly to the above, the mode may be changed in the direction of increasing the amount of power saving in accordance with the air temperature. Specifically, the mode is changed from the normal mode to the ECO 2 mode, and the ECO 2 mode is changed to the ECO 1 mode.

In the example of FIG. 17, in a case where the information processing apparatus acquires forecast information on an extremely hot day when the air temperature is equal to or higher than 35° C., the information processing apparatus performs a change from the time setting information stored in the time setting storage unit 306 of FIGS. 12A and 12B to the time setting information stored in the time setting storage unit 306 of FIG. 17.

In this example, on the assumption of a case where the air temperature in the daytime becomes higher, only the mode during 11-15 o'clock which is a time slot in the daytime is to be changed.

In another example, set modes may be changed in other time slots or through the day. That is, on an extremely hot day when the air temperature is equal to or higher than 35° C., the mode may be changed through the day in the direction of a decrease in the amount of power saving. Specifically, the mode is set to the ECO 2 mode at 11-15 o'clock, and the setting of the ECO 2 mode is cancelled and is changed to the normal mode. In addition, the mode is changed from the ECO 1 mode to the ECO 2 mode during 8-11 o'clock and 15-22 o'clock.

In addition, a configuration may be included in which a consumer can select whether to apply the setting of a change in operation contents according to the air temperature. For example, a configuration may be used in which a process of changing operation contents according to the air temperature is performed by accepting pressing of an air temperature button (not shown) by a consumer, and the process of changing operation contents according to the air temperature is stopped in a case where cancellation of the air temperature button by a consumer is accepted. In addition, a configuration is preferably adopted in which the setting contents according to the air temperature can also be displayed on a screen that makes it possible to check detailed contents as is the case with the example embodiment.

As described above, in the information processing apparatus of the present example embodiment, since the operation contents of a device according to the air temperature are further set for each mode, it is possible to prevent improper operation or control of the device from being performed such as raising the set temperature of an air conditioner on an extremely hot day in accordance with a mode in order to reduce the amount of power consumption.

Fifth Example Embodiment

An information processing apparatus according to a fifth example embodiment of the present invention is different from those of the above example embodiments, in that the information processing apparatus includes a configuration in which devices are registered by division into groups according to a room or the like, and the setting of a mode time is accepted for each group.

Figure 18:
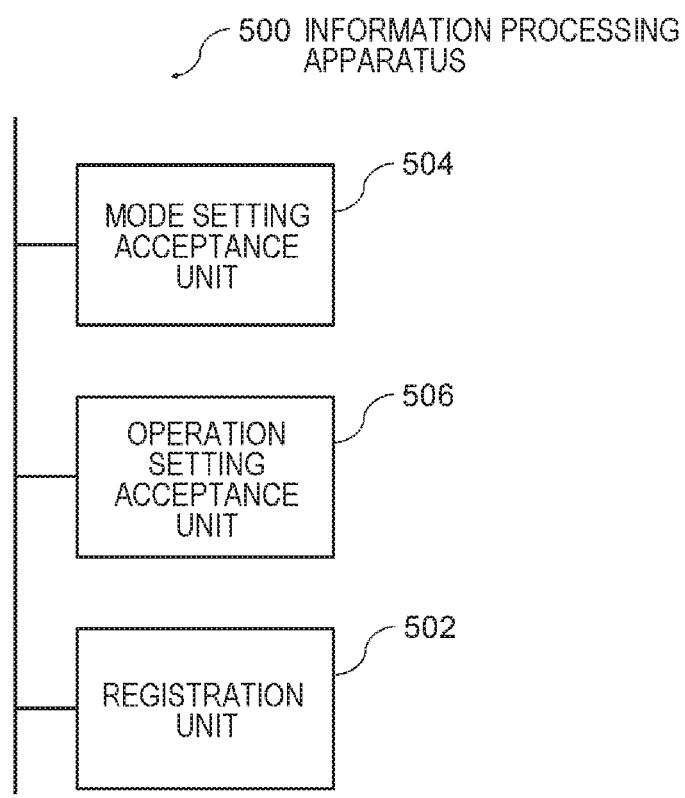
FIG. 18 is a functional block diagram logically illustrating a configuration of the information processing apparatus according to the example embodiment of the present invention.

FIG. 18 is a functional block diagram logically illustrating a configuration of an information processing apparatus 500 according to the example embodiment of the present invention.

The information processing apparatus 500 includes a registration unit 502 and a mode setting acceptance unit 504, in addition to any of the configurations of the above example embodiments.

In the information processing apparatus 500 of the present example embodiment, the registration unit 502 registers the devices 50 by division into a plurality of groups (such as rooms, floors, and family members as users (father/child/grandparents/pet)).

In each of the modes, the operation contents of a plurality of devices 50 are set according to the group.

The group may be divided into at least any one of, for example, rooms (such as bedroom, living room, kitchen, Japanese-style room, bathroom, toilet, foyer, or corridor), floors (such as first floor, second floor, or underground), users (such as father, mother, child, grandparents, or pet), and the like.

The registration unit 502 associatively stores at least one piece of information of the floor number, a user and the like, for each room. Further, the registration unit 502 also associatively stores information of device 50 for each room.

The groups may be registered using a plurality of classification methods. For example, various combinations may be made in which first-floor rooms (living room, kitchen, and Japanese-style room) are set to a first group, second-floor rooms (bedroom, children's room, and reading room) are set to a second group. The father's reading room is set to a third group, the grandparents' room is set to a fourth group, and the like.

A setting for each room may be determined on the basis of branched power distribution panels. In this case, the installation of a CT for each power distribution panel makes it possible to easily recognize the power consumption.

Information (information such as the floor number, a name of the room, or a user, and information of a device for each room) of the room of a consumer's home may be registered with the HEMS 40 by the consumer. Alternatively, information of the house of a consumer's home may be acquired from house builders, house sellers or the like, and registered with the cloud server 34 or the HEMS 40 by the consumer.

The operation contents of a device are preferably set using a standard setting on the basis of the application of each room (such as living room, kitchen, bedroom, reading room, or children's room) or a user's information. For example, since the bedroom is mostly used at night, the operation contents of a device in the bedroom are determined so that the amount of power consumption by the device in the daytime is lower than those by devices in other rooms. Moreover, since a room used by the grandparents is used even in the daytime, the operation contents of an air conditioner or the like in the grandparents' room are determined so that the adjustment amount of the set temperature of the air conditioner or the like in the daytime is kept low (for example, the temperature is fixed to +1° C. even in a case where a standard setting is +3° C.) although the amount of power saving may become small.

In the present example embodiment, the information processing apparatus 500 may further include an operation setting acceptance unit 506 that accepts the setting of the operation contents of a device according to the group, for each mode. According to this configuration, the operation contents of a device of a group set in advance on the basis of standard setting may be manually changed by a consumer.

Further, the mode setting acceptance unit 504 accepts the setting of a time to turn on a mode for each group.

A procedure of a setting is considered in various ways, and those exemplified below is not limited thereto. A plurality of procedures may be combined in a range having no inconsistency:

(d1) selecting a group (room or floor), and selecting a mode and time;

(d2) selecting a mode and a time, and selecting a group (room or floor); and (d3) selecting a group, and setting (changing) the operation contents of a device of the group.

For example, the floor plan of a consumer's home may be comprehensibly displayed on a screen to allow the consumer to select the group. As described above, in a case where the information of the house of a consumer's home is acquired from a house builder, a house seller or the like, display on a screen can be performed.

As shown in FIG. 19, in the present example embodiment, a device information display unit 512 displaying a screen 510 indicating detailed information of each device further includes a room information display column 614 of a device in the device information display unit 212 of the screen 210 of FIG. 9.

This device information display unit 512 may be configured to be capable of sorting a list with respect to at least one of rooms and devices (household electric appliances). In the example of FIG. 19, pieces of information of devices are arranged and displayed for each room, but pieces of information of the devices may be arranged and displayed in accordance with each type of device.

In addition, a configuration may be adopted in which the selection of a room is accepted during the detailed settings of a mode, and only information of devices of the room is extracted and displayed in the device information display unit 512.

As described above, in the information processing apparatus 500 according to the example embodiment of the present invention, the groups of the devices are registered by the registration unit 502, and the setting of a time to turn on a mode is accepted for each group by the mode setting acceptance unit 504. Thereby, according to the information processing apparatus 500 of the present example embodiment, an appropriate mode setting can be easily performed in consideration of information of a room in which a person is present or a room in which no persons are present in the daytime, or the like, providing superior convenience.

Sixth Example Embodiment

An information processing apparatus according to a sixth example embodiment of the present invention is different from those of the above example embodiments, in that the information processing apparatus includes a mode applied during the demand response execution period, and includes a configuration in which the time setting of the mode is accepted. The information processing apparatus of the present example embodiment may be combined with the configuration of any one of the information processing apparatuses of the above example embodiments.

Figure 20:
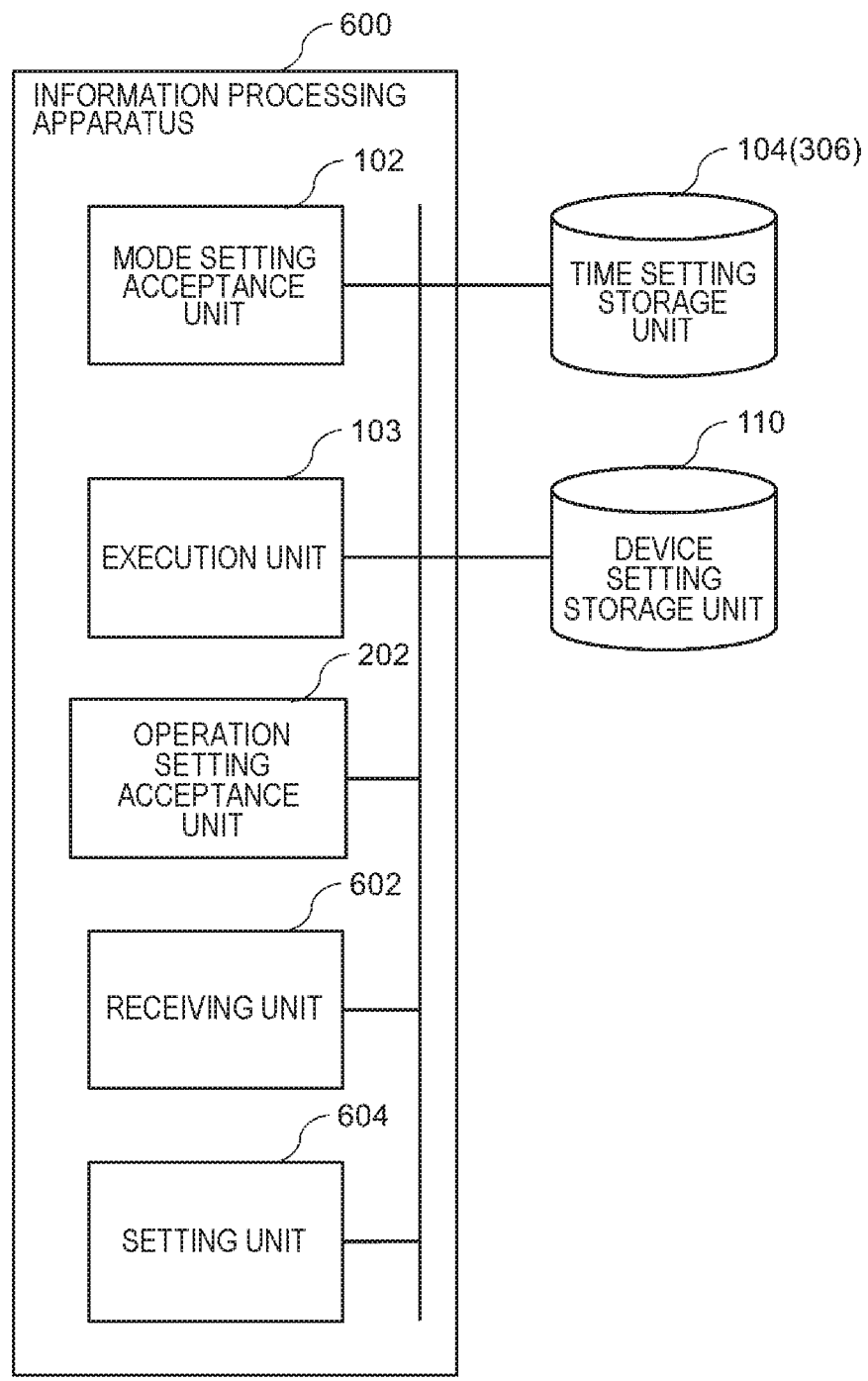
FIG. 20 is a functional block diagram logically illustrating a configuration of the information processing apparatus according to the example embodiment of the present invention.

FIG. 20 is a functional block diagram logically illustrating a configuration of an information processing apparatus 600 according to the example embodiment of the present invention.

The information processing apparatus 600 of the present example embodiment includes the mode setting acceptance unit 102, the execution unit 103, and the operation setting acceptance unit 202 which are the same as those of the information processing apparatus 200 of FIG. 8, and includes a receiving unit 602 and a setting unit 604.

In the present example embodiment, one of the modes is a demand response participation mode which is applied during the demand response execution period.

The receiving unit 602 receives a demand response.

The setting unit 604 performs the time setting of the demand response participation mode on the basis of information of the demand response execution time indicated by the received demand response.

In the above example embodiments, the time setting of a mode is configured such that a consumer operates a screen, but in the present example embodiment, the time setting of the demand response participation mode is configured such that a mode setting is automatically performed on the basis of the information of the demand response execution time indicated by the demand response.

Here, in the present invention, the demand response includes at least any one of the demand response itself sent from an electric power company or a PPS, and a request for power saving distributed to each household on the PPS or the cloud side which receives a demand response from the electric power company.

The request contents of the demand response include at least the execution date and time and execution period of the demand response, and information of the amount of power saving of the amount of power consumed by each consumer requested by the demand response.

The demand response is transmitted, for example, when a power shortage is predicted, or in order to obtain a reduction in power consumption from a consumer for the purpose of matching the power supply with the consumer's demand in units of 30 minutes. The source and transmission path of the demand response are considered to have various ways and are exemplified below, but there is no limitation thereto. In addition, the following multiple contents may be combined.

Here, a description will be given with reference to the schematic diagram of the system configuration of FIG. 1.

(e1) The demand response is transmitted from the electric power company server 20 through the A route to the smart meter 10, and is transmitted from the smart meter 10 through the B route to the HEMS 40.

(e2) The demand response is transmitted from the electric power company server 20 to the PPS server 32 or the cloud server 34 through a predetermined network (not shown), and is transmitted from the PPS server 32 or the cloud server 34 through the C route to the HEMS 40.

(e3) The demand response is transmitted from the PPS server 32 through the C route to the HEMS 40.

(e4) The demand response is transmitted from the PPS server 32 through a predetermined network (not shown) to the cloud server 34, and is transmitted from the cloud server 34 through the C route to the HEMS 40.

The setting unit 604 sets a time to turn on the demand response participation mode, using the execution date and time and execution period of the demand response indicated by the demand response. For example, in a case that the execution is for two hours on the next day from 12 o'clock, the setting unit 604 sets 12-14 o'clock on the next day to the demand response participation mode, and stores the time slot in the time setting storage unit 104 (or the time setting storage unit 306).

In the demand response participation mode, the operation contents of each device are preferably set in advance so as to achieve a power saving of equal to or less than a predetermined amount. Alternatively, a plurality of demand response participation modes in which the amounts of power saving are different from each other may be set in advance. In this case, the setting unit 604 may automatically select a mode that makes it possible to achieve the amount of power saving requested in the demand response, and automatically set a mode at a time corresponding to the execution period.

In addition, even during a time slot when the mode is already set to the ECO 1 mode, the ECO 2 mode or the like, the mode may be changed to the demand response participation mode in accordance with the time corresponding to the execution period of the demand response.

In addition, the operation contents of each device in the demand response participation mode may be configured to allow to change detailed settings as is the case with the above example embodiment, and may be configured to allow to select whether control is performed for each device.

The automatic setting performed by the setting unit 604 is preferably configured to allow to select whether the automatic setting is performed by a consumer in advance. Further, time periods may be specified as to whether the automatic setting is performed. In addition, configuration is preferably adopted in which a consumer is notified that the automatic setting has been performed. A notification method is not particularly limited. For example, a notification may be performed by displaying the method on the HEMS 40, the screen of the operating terminal 80, an LED indicator or the like, or by transmitting the method to the operating terminal 80 or the user terminal through an email.

As described above, in the information processing apparatus 600 of the present example embodiment, since the time setting of the demand response participation mode which can be transitioned in response to the demand response received by the receiving unit 602 can be automatically performed in an execution period indicated in the demand response, a consumer can easily participate in the operation setting of a device appropriate to the demand response.

Modification of Sixth Example Embodiment

Further, in the present example embodiment, the information processing apparatus 600 may further include a display unit (not shown) that displays, when a demand response is received, the amount of power saving indicated by the demand response and the execution time of the demand response.

Figure 21:
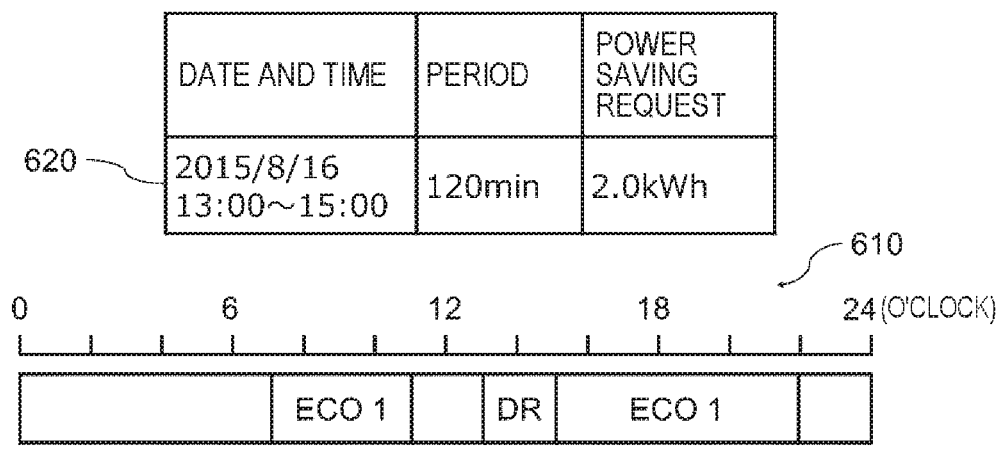
FIG. 21 is a diagram illustrating an example of a screen through which a display unit of the information processing apparatus of the present example embodiment performs display.

FIG. 21 is a diagram illustrating an example of a screen displayed by the display unit of the information processing apparatus 600 of the present example embodiment.

The screen of FIG. 21 includes a demand response information display unit 620 and a set time display unit 610 for each mode.

The execution date and time, the execution period, and the requested amount of power saving of the demand response are displayed on the demand response information display unit 620.

The time slots (7-11 o'clock and 15-22 o'clock) of the ECO 1 mode set by a consumer, and the time slot (13-15 o'clock) of the demand response participation mode (shown by "DR" in the drawing) set by the consumer are displayed on the set time display unit 610.

In this configuration, the mode setting acceptance unit 102 accepts the setting of a time slot to turn on the demand response participation mode selected on a mode setting screen by the consumer. A time slot automatically set by the setting unit 604 of the above example embodiment may be automatically displayed on the set time display unit 610.

For example, it is assumed that the ECO 1 mode is set in advance by a consumer at 7-11 o'clock and 15-22 o'clock. When a demand response is received, the demand response participation mode may be set at 13-15 o'clock automatically by the setting unit 604 or manually with reference to the demand response information display unit 620 by the consumer, on the basis of information of the execution time of the demand response indicated by the received demand response and the requested amount of power saving of the amount of power consumption.

In addition, display may be performed so that an automatically set time slot and a time slot set by a consumer or a time slot in which an automatic setting is approved can be distinguished from each other. This would allow the automatically set time slot to be approved by the consumer.

In a case of the demand response participation mode, as is the case with the above example embodiment, the operation contents of a plurality of devices are read out from the device setting storage unit 110 by the execution unit 103 at a set time or a predetermined time before the set time, and the devices are automatically controlled in accordance with the operation contents, or a consumer is notified of a device operation method.

Regarding specific device control contents in the demand response participation mode, as is the case with the second example embodiment, control contents for each device may be set by a consumer, or a setting using the device control contents in the ECO 1 mode or the ECO 2 mode which are already set may also be considered as the device control contents in the demand response participation mode.

According to this configuration, the consumer can easily perform the time setting of a mode in accordance with the demand response execution time while checking the requested amount of power saving. Alternatively, since the consumer is allowed to approve the automatically set time slot, it is possible to make the consumer conscious of the consumer's participation in a demand response, or to avoid inconveniences caused by automatic settings.

Hereinbefore, although the example embodiments of the present invention have been set forth with reference to the accompanying drawings, the example embodiments are merely illustrative of the present invention, and various configurations other than those stated above can be adopted.

In the above example embodiment, a description has been given of a configuration in which, in the operation control of the device 50, the ECHONET Lite authentication device or the like is automatically performed by the HEMS 40, or is manually operated by a consumer.

In another example embodiment, for example, a configuration may be used in which the operation control of the device 50 is performed automatically by a terminal having a device control function through infrared communication, or by remote control from a consumer's portable terminal.

Hereinbefore, the present invention has been described with reference to the example embodiments and the example, but the present invention is not limited to the example embodiments and the examples described above. In the configurations and the details of the present invention, various changes and modifications as can be understood by those skilled in the art can be made without departing from the scope of the present invention.

Note that, in a case where information relating to a user is acquired and used in the present invention, this is assumed to be duly performed.

Some or all of the example embodiments may be described as in the following additions, but there is no limitation thereto.

1. An information processing apparatus including:
   a mode setting acceptance unit that accepts a setting of a time to control a plurality of devices, on the basis of a mode in which operation contents of the devices are determined; and
   an execution unit that outputs the operation contents of the plurality of devices at the set time.

2. The information processing apparatus according to 1, wherein a plurality of the modes are provided in which total amounts of power consumed by a consumer are different from each other, and the mode setting acceptance unit accepts a selection of the mode to be set according to a time slot.

3. The information processing apparatus according to 1 or 2, further including an operation setting acceptance unit that accepts a setting of the operation contents of each device for each of the modes.

4. The information processing apparatus according to any one of 1 to 3,
wherein the operation contents of the device according to an air temperature are further set for each of the modes.

5. The information processing apparatus according to 4,
wherein the execution unit changes and outputs the operation contents in the mode of the device in accordance with the air temperature.

6. The information processing apparatus according to 4 or 5,
wherein an air temperature is determined at which the mode is set or cancelled, and
the execution unit changes, in accordance with an air temperature, a mode during the time corresponding to the air temperature, and outputs the operation contents of the device in the changed mode.

7. The information processing apparatus according to any one of 1 to 6, further including a registration unit that registers the devices by division into a plurality of groups,
wherein in each of the modes, the operation contents of the plurality of devices are determined according to the group.

8. The information processing apparatus according to any one of 1 to 7, further including a registration unit that registers the devices by division into a plurality of groups,
wherein the mode setting acceptance unit accepts a setting of a time of the mode for each of the groups.

9. The information processing apparatus according to any one of 1 to 8,
wherein the plurality of modes include a first mode and a second mode in which a total amount of power consumed by the devices is to be higher than that in the first mode, and
the information processing apparatus further includes:
an operation setting acceptance unit that accepts settings of the operation contents of the devices for each of the modes;
a calculation unit that calculates a total amount of power consumption for each of the modes, on the basis of the accepted settings of the operation contents of the devices for each of the modes; and
a notification unit that gives notice to a user in a case where the calculated total amount of power consumed by the devices in the second mode is smaller than the calculated total amount of power consumed by the devices in the first mode, on the basis of the operation contents of the devices for each of the modes.

10. The information processing apparatus according to any one of 1 to 9,
wherein one of the modes is a demand response participation mode which is applied during a demand response execution period, and
the information processing apparatus further includes:
a receiving unit that receives a demand response; and
a setting unit that performs a time setting of the demand response participation mode on the basis of information of a demand response execution time indicated by the received demand response.

11. The information processing apparatus according to any one of 1 to 10,
wherein one of the modes is a demand response participation mode which is applied during the demand response execution period, and the information processing apparatus further includes:
a receiving unit that receives a demand response; and
a display unit that displays an amount of power saving and the demand response execution time which are indicated by the demand response when the demand response is received, and
the mode setting acceptance unit accepts a setting of a time to turn on the demand response participation mode.

12. The information processing apparatus according to any one of 1 to 11,
wherein at a set execution time, the execution unit executes automatic control of a determined plurality of devices in accordance with the operation contents of the plurality of devices, or gives notice of the operation contents of the plurality of devices.

13. The information processing apparatus according to 12,
wherein in a case where the set execution time is terminated, the execution unit terminates the control according to the operation contents of the determined plurality of devices, or gives notice of the termination of the execution time of the control according to the operation contents of the plurality of devices.

14. The information processing apparatus according to any one of 1 to 13, further including a power consumption acquisition unit that acquires an amount of power consumed by the device,
wherein the execution unit controls the device in a case where the amount of power consumed by the device acquired by the power consumption acquisition unit is larger than an amount of power consumed by the device in a case where the device is controlled in accordance with the operation contents in a set mode.

15. The information processing apparatus according to any one of 1 to 14, further including
an operating state acquisition unit that acquires a history of operating state information of the device; and
a display unit that displays the operation contents of the device at a set time of the mode or an amount of power consumed by the device in a case where the device is controlled in accordance with the operation contents of the mode, on the basis of the history.

16. An information processing method executed by an information processing apparatus, the method including:
accepting a setting of a time to control a plurality of devices, on the basis of a mode in which operation contents of the devices are determined; and
outputting the operation contents of the plurality of devices at the set time.

17. The information processing method according to 16,
wherein in the information processing apparatus, the mode comprises a plurality of modes in which total amounts of power consumed by a consumer are different from each other, and
the method executed by the information processing apparatus includes accepting a selection of the mode to be set according to a time slot.

18. The information processing method according to 16 or 17, the method executed by the information processing apparatus including accepting a setting of the operation contents of each device for each of the modes.

19. The information processing method according to any one of 16 to 18,
wherein in the information processing apparatus, the operation contents of the device according to an air temperature are further set for each of the modes.

20. The information processing method according to 19, the method executed by the information processing apparatus including changing and outputting the operation contents in the mode of the device in accordance with the air temperature.

21. The information processing method according to 19 or 20, wherein in the information processing apparatus, an air temperature is determined at which the mode is set or cancelled, and the method executed by the information processing apparatus includes changing, in accordance with an air temperature, a mode during the time corresponding to the air temperature, and outputting the operation contents of the device in the changed mode.

22. The information processing method according to any one of 16 to 21, the method executed by the information processing apparatus including:

registering the devices by division into a plurality of groups; and determining the operation contents of the plurality of devices, according to the group, in each of the modes.

23. The information processing method according to any one of 16 to 22, the method executed by the information processing apparatus including:

registering the devices by division into a plurality of groups; and accepting a setting of a time of the mode for each of the groups.

24. The information processing method according to any one of 16 to 23, wherein in the information processing apparatus, a first mode and a second mode in which a total amount of power consumed by the devices is to be higher than that in the first mode are included, and the method executed by the information processing apparatus further includes:

accepting a setting of the operation contents of the devices for each of the modes;

calculating a total amount of power consumption for each of the modes, on the basis of the accepted setting of the operation contents of the devices for each of the modes; and giving notice to a user in a case where the calculated total amount of power consumed by the devices in the second mode is smaller than the calculated total amount of power consumed by the devices in the first mode, on the basis of the operation contents of the devices for each of the modes.

25. The information processing method according to any one of 16 to 24, wherein in the information processing apparatus, one of the modes is a demand response participation mode which is applied during a demand response execution period, and the method executed by the information processing apparatus includes:

receiving a demand response; and performing a time setting of the demand response participation mode on the basis of information of a demand response execution time indicated by the received demand response.

26. The information processing method according to any one of 16 to 25, wherein in the information processing apparatus, one of the modes is a demand response participation mode which is applied during a demand response execution period, and the method executed by the information processing apparatus further includes:

receiving a demand response;

displaying an amount of power saving and a demand response execution time which are indicated by the demand response when the demand response is received; and accepting a setting of a time to turn on the demand response participation mode.

27. The information processing method according to any one of 16 to 26, the method executed by the information processing apparatus including automatically controlling a determined plurality of devices in accordance with the operation contents of the plurality of devices, or giving notice of the operation contents of the plurality of devices.

28. The information processing method according to 27, the method executed by the information processing apparatus including, in a case where the set execution time is terminated, terminating the control according to the operation contents of the determined plurality of devices, or giving notice of the termination of the execution time of the control according to the operation contents of the plurality of devices.

29. The information processing method according to any one of 16 to 28, the method executed by the information processing apparatus including:

acquiring an amount of power consumed by the device; and controlling the device in a case where the acquired amount of power consumed by the device is larger than an amount of power consumed by the device in a case where the device is controlled in accordance with the operation contents in a set mode.

30. The information processing method according to any one of 16 to 29, the method executed by the information processing apparatus further including:

acquiring a history of operating state information of the device; and displaying the operation contents of the device at a set time of the mode or an amount of power consumed by the device in a case where the device is controlled in accordance with the operation contents of the mode, on the basis of the history.

31. A program causing a computer to execute:

a procedure of accepting a setting of a time to control a plurality of devices, on the basis of a mode in which operation contents of the devices are determined; and a procedure of outputting the operation contents of the plurality of devices at the set time.

32. The program according to 31, wherein the mode comprises a plurality of modes in which total amounts of power consumed by a consumer are different from each other, and the program causes a computer to execute a procedure of accepting a selection of the mode to be set according to a time slot.

33. The program according to 31 or 32, causing a computer to execute a procedure of accepting a setting of the operation contents of each device for each of the modes.

34. The program according to any one of 31 to 33, wherein the operation contents of the device according to an air temperature are further set for each of the modes.

35. The program according to 34, causing a computer to execute a procedure of changing and outputting the operation contents in the mode of the device in accordance with the air temperature.

36. The program according to 34 or 35, wherein an air temperature is determined at which the mode is set or cancelled, and the program causes a computer to execute a procedure of changing, in accordance with an air temperature, a mode during a time corresponding to the air temperature, and outputting the operation contents of the device in the changed mode.

37. The program according to any one of 31 to 36, causing a computer to execute a procedure of registering the devices by division into a plurality of groups,
wherein in each of the modes, the operation contents of the plurality of devices are determined according to the group.

38. The program according to any one of 31 to 37, causing a computer to execute:
a procedure of registering the devices by division into a plurality of groups; and
a procedure of accepting a setting of a time of the mode for each of the groups.

39. The program according to any one of 31 to 38,
wherein the plurality of modes include a first mode and a second mode in which a total amount of power consumed by the devices is to be higher than that in the first mode, and
the program causes a computer to execute:
a procedure of accepting settings of the operation contents of the devices for each of the modes;
a procedure of calculating a total amount of power consumption for each of the modes, on the basis of the accepted settings of the operation contents of the devices for each of the modes; and
a procedure of giving notice to a user in a case where the calculated total amount of power consumed by the devices in the second mode is smaller than the calculated total amount of power consumed by the devices in the first mode, on the basis of the operation contents of the devices for each of the modes.

40. The program according to any one of 31 to 39,
wherein one of the modes is a demand response participation mode which is applied during a demand response execution period, and
the program causes a computer to execute:
a procedure of receiving a demand response; and
a procedure of performing a time setting of the demand response participation mode on the basis of information of a demand response execution time indicated by the received demand response.

41. The program according to any one of 31 to 40,
wherein one of the modes is a demand response participation mode which is applied during a demand response execution period, and
the program causes a computer to execute:
a procedure of receiving a demand response;
a procedure of displaying an amount of power saving and the demand response execution time which are indicated by the demand response when the demand response is received; and
a procedure of accepting a setting of a time to turn on the demand response participation mode.

42. The program according to any one of 31 to 41, causing a computer to execute, at a set execution time, a procedure of executing automatic control of a determined plurality of devices in accordance with the operation contents of the plurality of devices, or a procedure of giving notice of the operation contents of the plurality of devices.

43. The program according to 42, causing a computer to execute, in a case where the set execution time is terminated, a procedure of terminating the control according to the operation contents of the determined plurality of devices, or a procedure of giving notice of the termination of the execution time of the control according to the operation contents of the plurality of devices.

44. The program according to any one of 31 to 43, causing a computer to execute:
a procedure of acquiring an amount of power consumed by the device; and
a procedure of controlling the device in a case where the amount of power consumed by the device which is acquired by the procedure of acquiring an amount of power consumed by the device is larger than an amount of power consumed by the device in a case where the device is controlled in accordance with the operation contents in a set mode.

45. The program according to any one of 31 to 44, causing a computer to execute:
a procedure of acquiring a history of operating state information of the device; and
a procedure of displaying the operation contents of the device at a set time of the mode or an amount of power consumed by the device in a case where the device is controlled in accordance with the operation contents of the mode, on the basis of the history.

The invention claimed is:
1. An information processing apparatus comprising:
at least one memory configured to store instructions; and
at least one processor configured to execute the instructions comprising:
mode setting acceptance code configured to accept a setting of a time to control a plurality of devices, on the basis of a mode in which operation contents of the devices are determined; and
execution code configured to output the operation contents of the plurality of devices at the set time,
wherein a plurality of modes comprise a first mode and a second mode in which a total amount of power consumed by the plurality of devices is set to be higher than that in the first mode, and
wherein the information processing apparatus further comprises:
operation setting acceptance code configured to accept settings of the operation contents of the devices for each of the modes;
calculation code configured to calculate a total amount of power consumption for each of the modes, on the basis of the accepted settings of the operation contents of the devices for each of the modes; and
notification code configured to give a notice to a user in a case where the calculated total amount of power consumption by the devices in the second mode is smaller than the calculated total amount of power consumption by the devices in the first mode, on the basis of the operation contents of the devices for each of the modes.

2. An information processing method executed by an information processing apparatus, the method comprising:
accepting a setting of a time to control a plurality of devices, on the basis of a mode in which operation contents of the devices are determined;
outputting the operation contents of the plurality of devices at the set time,
wherein a plurality of modes comprise a first mode and a second mode in which a total amount of power consumed by the plurality of devices is set to be higher than that in the first mode, and
wherein the information processing method further comprises:
accepting settings of the operation contents of the devices for each of the modes;

calculating a total amount of power consumption for each of the modes, on the basis of the accepted settings of the operation contents of the devices for each of the modes; and giving a notice to a user in a case where the calculated total amount of power consumption by the devices in the second mode is smaller than the calculated total amount of power consumption by the devices in the first mode, on the basis of the operation contents of the devices for each of the modes.

3. A non-transitory computer readable storage medium storing a program causing a computer to execute:

a procedure of accepting a setting of a time to control a plurality of devices, on the basis of a mode in which operation contents of the devices are determined; and a procedure of outputting the operation contents of the plurality of devices at the set time, wherein a plurality of modes comprise a first mode and a second mode in which a total amount of power consumed by the plurality of devices is set to be higher than that in the first mode, and wherein the program is further capable of causing the computer to execute:

a procedure of accepting settings of the operation contents of the devices for each of the modes;

a procedure of calculating a total amount of power consumption for each of the modes, on the basis of the accepted settings of the operation contents of the devices for each of the modes; and a procedure of giving a notice to a user in a case where the calculated total amount of power consumption by the devices in the second mode is smaller than the calculated total amount of power consumption by the devices in the first mode, on the basis of the operation contents of the devices for each of the modes.

* * * * *

UNITED STATES PATENT AND TRADEMARK OFFICE
CERTIFICATE OF CORRECTION

PATENT NO. : 10,719,894 B2
APPLICATION NO. : 15/765192
DATED : July 21, 2020
INVENTOR(S) : Yusuke Mori et al.

It is certified that error appears in the above-identified patent and that said Letters Patent is hereby corrected as shown below:

In the Specification

Column 6, Description of Embodiments, Line 53; After "HEMS", insert --40--

Column 14, Description of Embodiments, Line 14; Before "and", insert --40--

Column 15, Description of Embodiments, Line 3; After "HEMS", insert --40--

Signed and Sealed this
Eighth Day of December, 2020

Andrei Iancu
*Director of the United States Patent and Trademark Office*